(12) United States Patent
Calafiore et al.

(10) Patent No.: US 11,294,187 B2
(45) Date of Patent: Apr. 5, 2022

(54) THIN WAVEGUIDE BEAM REDIRECTOR AND DISPLAY BASED THEREON

(71) Applicant: Facebook Technologies, LLC, Menlo Park, CA (US)

(72) Inventors: Giuseppe Calafiore, Redmond, WA (US); Alexander Koshelev, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 51 days.

(21) Appl. No.: 16/924,820

(22) Filed: Jul. 9, 2020

(65) Prior Publication Data

US 2021/0302736 A1  Sep. 30, 2021

Related U.S. Application Data

(60) Provisional application No. 63/012,625, filed on Apr. 20, 2020, provisional application No. 63/002,817, filed on Mar. 31, 2020.

(51) Int. Cl.
*G02B 27/01* (2006.01)
*G02B 6/35* (2006.01)
(Continued)

(52) U.S. Cl.
CPC ........... *G02B 27/0172* (2013.01); *G02B 6/28* (2013.01); *G02B 6/3548* (2013.01); *G02B 6/3596* (2013.01); *G02B 6/0016* (2013.01); *G02B 6/0038* (2013.01); *G02B 6/0056* (2013.01); *G02B 6/12007* (2013.01);
(Continued)

(58) Field of Classification Search
None
See application file for complete search history.

(56) References Cited

U.S. PATENT DOCUMENTS 10,261,389 B2   4/2019  Skirlo et al.
2003/0012533 A1  1/2003  Steiner et al.
(Continued)

FOREIGN PATENT DOCUMENTS

WO    2017060665    4/2017

OTHER PUBLICATIONS

"High-efficiency broadband light coupling between optical fibers and photonic integrated circuits" Son et al, Nanophontics 2018; 7(12): 1845-1864.
(Continued)

*Primary Examiner* — Jerry Rahll
(74) *Attorney, Agent, or Firm* — Pequignot + Myers; Matthew A. Pequignot

(57) ABSTRACT

A device for redirecting light in two dimensions (2D) includes a wavelength-tunable light source for providing light having a spectral component at a first wavelength. A 1D redirector redirects the light in a first plane. A thin waveguide is disposed in the first plane. The thin waveguide includes a slab waveguide portion coupled to the 1D redirector for propagating light redirected by the 1D redirector. The slab waveguide portion includes a wavelength-sensitive out-coupler out-coupling the light in a second plane at an angle dependent on the first wavelength. Thus, the light is redirected in two dimensions. A display device providing image in angular domain may be based on the device for redirecting light in two dimensions.

13 Claims, 21 Drawing Sheets

(51) Int. Cl.
*G02B 6/28* (2006.01)
*F21V 8/00* (2006.01)
*G02B 6/12* (2006.01)
*G02B 26/10* (2006.01)
*G02B 27/10* (2006.01)

(52) U.S. Cl.
CPC ........ *G02B 26/103* (2013.01); *G02B 27/0101* (2013.01); *G02B 27/0176* (2013.01); *G02B 27/1006* (2013.01); *G02B 2006/12159* (2013.01); *G02B 2027/015* (2013.01); *G02B 2027/0118* (2013.01); *G02B 2027/0125* (2013.01); *G02B 2027/0174* (2013.01)

(56) References Cited

U.S. PATENT DOCUMENTS

| | | |
|---|---|---|
| 2016/0026253 A1 | 1/2016 | Bradski et al. |
| 2017/0003507 A1 | 1/2017 | Raval et al. |
| 2017/0299860 A1 | 10/2017 | Wall et al. |
| 2017/0371227 A1 | 12/2017 | Skirlo et al. |
| 2018/0231712 A1 | 8/2018 | Pare et al. |
| 2018/0321496 A1 | 11/2018 | Bohn et al. |
| 2019/0339447 A1 | 11/2019 | Shipton et al. |
| 2021/0302738 A1 | 9/2021 | Calafiore et al. |

OTHER PUBLICATIONS

"Silicon nitride optical phased array based on a grating antenna enabling wavelength-tuned beam steering" by Im et al., Optics Express, vol. 28, No. 3/Feb. 3, 2020, pp. 3270-3279.
https://www.sweptlaser.com/ Home page printed Jul. 30, 2020.
"Long-Range LiDAR and Free-Space Data Communication with High-Performance Optical Phased Arrays" by Poulton et al., IEEE Journal of Selected Topics in Quantum Electronics, IEEE Service Center, vol. 25, No. 5, Sep. 1, 2019.
"Integrated optical phased arrays: LiDAR, augmented reality, and beyond" by Notaros et al., Enhanced and Synthetic vision 2003 : [Conference enhanced and synthetic vision 2002] Proceedings of SPIE vol. 11285, Feb. 26, 2020.
PCT/US2021/019710 Search Report dated May 5, 2021.
PCT/US2021/019710 Written Opinion dated May 5, 2021.
PCT/US2021/016661 Search Report dated Apr. 30, 2021.
PCT/US2021/016661 Written Opinion dated Apr. 30, 2021.
PCT/US2021/016631 Search Report dated Apr. 30, 2021.
PCT/US2021/016631 Written Opinion dated Apr. 30, 2021.

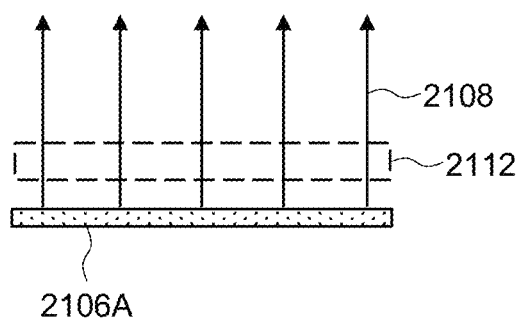
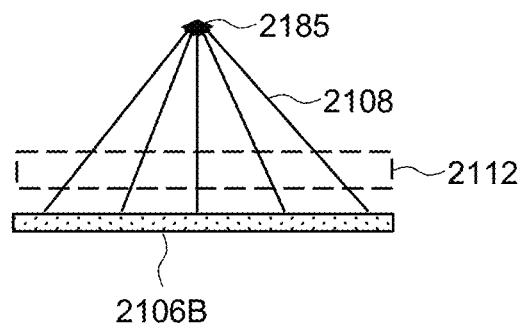
FIG. 21A          FIG. 21B
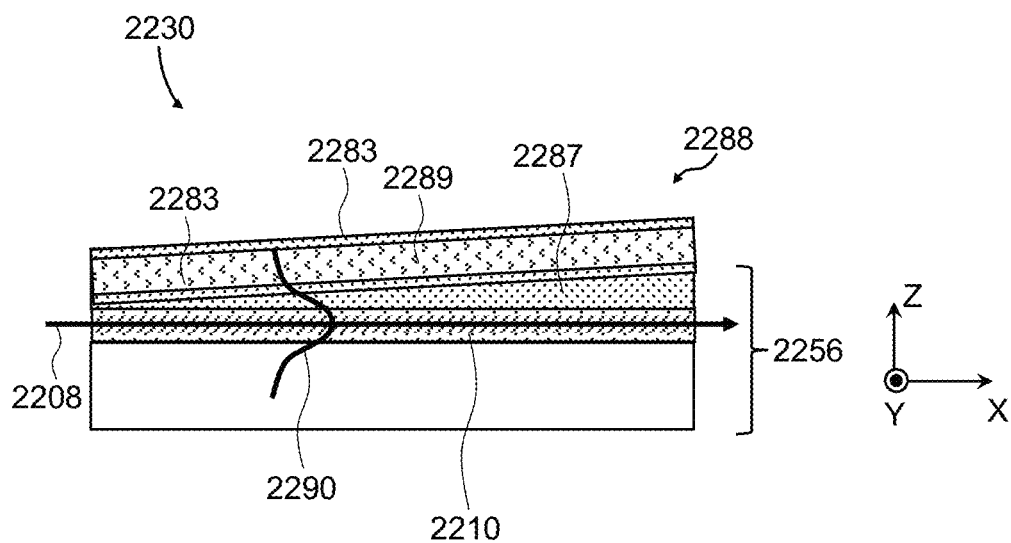
FIG. 22

THIN WAVEGUIDE BEAM REDIRECTOR AND DISPLAY BASED THEREON

REFERENCE TO RELATED APPLICATIONS

The present application claims priority from U.S. Provisional Patent Application No. 63/002,817, filed on Mar. 31, 2020 and entitled "Single- or Few-Mode Waveguide Display" and U.S. Provisional Patent Application No. 63/012,625, filed on Apr. 20, 2020 and entitled "Single- or Few-Mode Waveguide Display", both of which being incorporated herein by reference in their entireties.

TECHNICAL FIELD

The present disclosure relates to optical devices, and in particular to display systems and modules.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user.

To provide better optical performance, display systems and modules may include a large number of components such as lenses, waveguides, display panels, etc. Because a display of an HMD or NED is usually worn on the head of a user, a large, bulky, unbalanced, and/or heavy display device would be cumbersome and may be uncomfortable for the user to wear. Compact, lightweight, and efficient head-mounted display devices and modules are desirable.

BRIEF DESCRIPTION OF THE DRAWINGS

Exemplary embodiments will now be described in conjunction with the drawings, in which:

FIGS. 21A and 21B are schematic side views of a low-mode slab waveguide with a gradient of refractive index for variably focusing or defocusing the image light out-coupled from the waveguide;

FIG. 22 is a side cross-sectional views of a varifocal out-coupler embodiment based on a tilted liquid crystal (LC) cell;

DETAILED DESCRIPTION

Figure 1A:
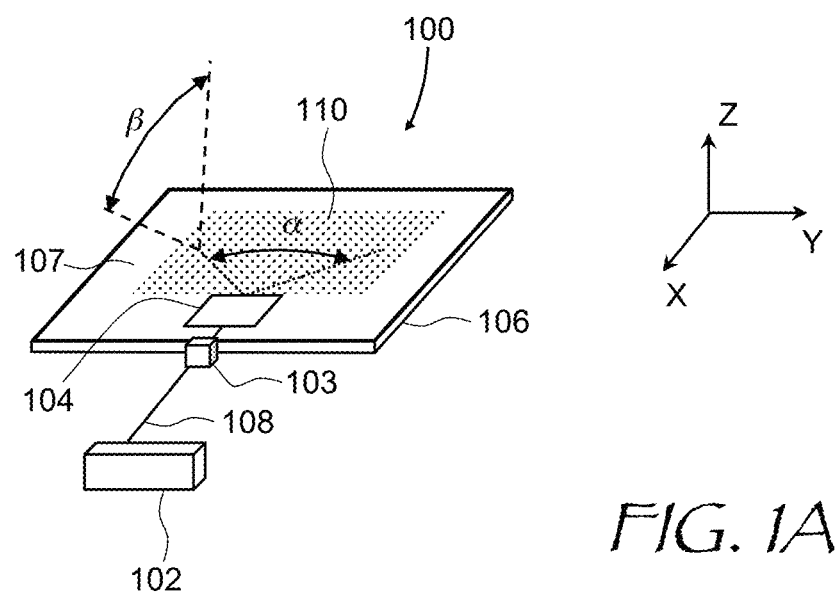
FIG. 1A is a 3D view of a device for redirecting light in two dimensions, the device including a low-mode waveguide.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1A, 1B, 2, 3, 4A, 5, 6A, 7-9, 10A-10E, 11, 12, 13A, 13B, and 14-25, similar reference numerals denote similar elements.

Near-eye displays (NEDs) may use pupil-replicating waveguides to expand a projected image over an eyebox of the display, i.e. over an area where user's eye may be located during normal operation, e.g. when the display is worn by the user. A pupil-replicating waveguide is typically a parallel slab of a transparent material propagating image light in a zigzag pattern by total internal reflection (TIR) from the waveguide's top and bottom surfaces. Such waveguides may be prone to diffraction effects that cause color dispersion as function of field angle, and are generally unsuitable for curved substrates and present ghost images for real-world up-close objects.

In accordance with this disclosure, single mode (SM) or few-mode (FM) waveguides, termed herein collectively as "low-mode" waveguides, may be used to deliver light to the eyebox and form an image. An advantage of low-mode waveguides is that light interacts with gratings several orders of magnitude more often compared to a regular multimode light guide. As a result, the diffraction efficiency of the grating for every single interaction may be made small enough to lessen or eliminate see-through artifacts such as rainbow and improve conspicuity of the display. Additionally, single mode waveguides enable more precise control of light distribution across the eyebox, which leads to better uniformity and efficiency.

A challenge of using a single mode waveguide is that it only has capacity to transmit 1D information, e.g. horizontal resolution but not vertical resolution, or vice versa. This limitation may be overcome by encoding the other component of 2D image in a non-spatial characteristic of light such as wavelength, for example. The wavelength range used for each color channel may be made small enough to not reduce the color gamut significantly.

In accordance with this disclosure, there is provided a device for redirecting light in two dimensions. The device comprises a wavelength-tunable light source for providing light comprising a spectral component at a first wavelength; a 1D redirector coupled to the wavelength-tunable light source for redirecting the light in a first plane; a low-mode waveguide in the first plane; and an in-coupler for coupling the light into the low-mode waveguide. The low-mode waveguide comprises a slab waveguide portion coupled to the 1D redirector for propagating the light redirected by the 1D redirector. The slab waveguide portion comprises an out-coupler configured to out-couple the spectral component of the redirected light in a second plane at an angle dependent on the first wavelength. The second plane is non-parallel to the first plane.

The slab waveguide portion may include e.g. a singlemode slab waveguide or a few-mode slab waveguide supporting no more than 10 lateral modes of propagation. In some embodiments, the 1D redirector comprises a microelectromechanical system (MEMS) beam scanner. The wavelength-tunable light source may be optically coupled to the MEMS beam scanner, and the in-coupler may be configured to couple the light redirected by the MEMS beam scanner into the slab waveguide portion. In some embodiments, the low-mode waveguide comprises the 1D redirector, and the in-coupler is configured to couple the light provided by the wavelength-tunable light source into the 1D redirector. The low-mode waveguide may include the in-coupler, and the in-coupler may include e.g. a Bragg grating configured to receive the light provided by the wavelength-tunable light source. In some embodiments, the wavelength-tunable light source comprises a wavelength-tunable laser comprising an intracavity wavelength-selective element for selecting the spectral component at the first wavelength.

In embodiments where the low-mode waveguide comprises the 1D redirector, the 1D redirector may include an optical phased array. The optical phased array may include a binary tree of tunable Mach-Zehnder interferometers coupled to an array of phase shifters. The 1D redirector may include a binary tree of tunable Mach-Zehnder interferometers, an array of linear waveguides coupled to the binary tree of tunable Mach-Zehnder interferometers, and a collimating element coupled to the array of linear waveguides for converting a lateral position of a linear waveguide of the array of linear waveguides into a beam angle of a light portion propagating in the linear waveguide of the array of linear waveguides.

In some embodiments, the low-mode waveguide comprises a 1D field of view (FOV) expander in an optical path of the light, wherein the 1D FOV expander is configured to switch the light between a plurality of conterminous FOV portions. The 1D FOV expander may include a tunable beam steering device comprising a liquid crystal (LC) cladding section of the slab waveguide portion of low-mode waveguide. The low-mode waveguide may include a 1D lateral beam expander in an optical path of the light, and the 1D lateral beam expander may be configured to increase a width of a collimated portion of the light in the first plane. The 1D lateral beam expander may include a hologram configured to reflect the collimated portion of the light at a plurality of locations along the optical path in the hologram, such that the reflected collimated portion is wider in the first plane than the collimated portion upstream of the hologram.

In accordance with the present disclosure, there is provided a device for providing an image in angular domain. The device includes a wavelength-tunable light source for providing image light comprising a spectral component at a first wavelength, and a low-mode waveguide in a first plane. The low-mode waveguide includes an in-coupler for coupling the image light into the low-mode waveguide, a 1D imager coupled to in-coupler for redirecting the image light in the first plane, and a slab waveguide portion coupled to the 1D imager for propagating the image light redirected by the 1D imager. The slab waveguide portion includes an out-coupler configured to out-couple the spectral component of the redirected image light in a second plane at an angle dependent on the first wavelength. The second plane is non-parallel to the first plane. The low-mode waveguide may include e.g. a singlemode waveguide or a few-mode waveguide supporting e.g. up to 10 lateral modes of propagation.

In accordance with the present disclosure, there is further provided a method for providing an image in angular domain. The method includes coupling image light comprising a spectral component at a first wavelength to a 1D imager; using the 1D imager to redirect the image light in a first plane; propagating the image light redirected by the 1D imager in a in a low-mode slab waveguide disposed in the first plane; and out-coupling the spectral component of the image light from the low-mode slab waveguide at an angle dependent on the first wavelength.

In some embodiments, the image light is substantially monochromatic at the first wavelength. In some embodiments, the first wavelength is not shifted while the 1D imager redirects the image light in the first plane, whereby the image light redirected in the first plane is out-coupled at the same angle. Redirecting the image light in the first plane may include angularly scanning a collimated light beam in the first plane. In some embodiments, the image light includes a plurality of spectral components at a plurality of wavelengths including the first wavelength. Redirecting the image light in the first plane may include providing an angular distribution of brightness in the first plane, whereby the image light is redirected in the first plane simultaneously at a plurality of directions, and is out-coupled from the low-mode slab waveguide at a plurality of angles corresponding to the plurality of wavelengths of the plurality of spectral components of the image light.

Referring now to FIG. 1A, a device 100 provides an image in angular domain. The image may be defined by a light field having a two-dimensional (2D) angular distribution of brightness $I(\alpha,\beta)$. The angles $\alpha,\beta$ are ray angles of the image light defining the ray angle in 3D space, as shown in FIG. 1A. More generally, the device 100 is usable for redirecting light in two dimensions or along two non-parallel planes or surfaces, e.g. for 2D beam rastering, remote sensing, depth sensing, LIDAR applications, etc. Herein, the term "redirecting" includes rastering of a collimated light beam, as well as providing instantaneous distributions of light in one or two dimensions or planes.

The device 100 includes a light source 102, an 1D redirector 104 coupled to the light source 102, and a low-mode waveguide 106 coupled to the 1D redirector 104 by a coupler 103. The low-mode waveguide 106 includes a slab waveguide portion 107. Herein, the term "slab waveguide" denotes a waveguide that limits the light propagation only in one dimension, i.e. vertical direction or Z-direction perpendicular to the waveguide plane, allowing the light to freely propagate in plane of the waveguide, e.g. in XY plane in the example of FIG. 1A. The light source 102 provides light 108 having a tunable optical spectrum, which is a function of the desired distribution of brightness $I(\alpha,\beta)$. For example, the tunable optical spectrum may have a plurality of spectral components; in some embodiments, one spectral component may be provided at a tunable wavelength.

The 1D redirector 104 receives the light 108 from the light source 102 and redirects, e.g. angularly disperses, the light 108 in XY plane, i.e. the plane of the low-mode waveguide 106, in accordance with the desired distribution of brightness $I(\alpha,\beta)$. In display applications, the 1D redirector 104 functions as a 1D imager providing a line of a 2D image. The slab waveguide portion 107 is a singlemode waveguide or a few-mode waveguide configured for propagating the light 108 in XY plane but confining and guiding the light propagation along Z-axis. The slab waveguide portion 107 includes an out-coupler 110 that out-couples the image light 108 at angle(s) to the low-mode waveguide 106 plane (XY plane), the angle depending on the wavelength(s) of the spectral component(s) of the light 108. In some embodiments, a single tunable spectral component may be out-coupled by the out-coupler 110 at an angle depending on its wavelength, in a plane disposed at an angle to the plane of the low-mode waveguide 106, that is, XY plane; and in some embodiments, a plurality of spectral components is out-coupled simultaneously, or instantaneously, at a distribution of angles corresponding to the distribution of the wavelengths of the spectral components. The distribution of the out-coupling angles is defined by the tunable optical spectrum of the light 108. The angular distribution of brightness in both X- and Y-directions may be controlled to provide the image in angular domain having the the desired distribution of brightness $I(\alpha,\beta)$, for direct observation by a viewer.

Figure 1B:
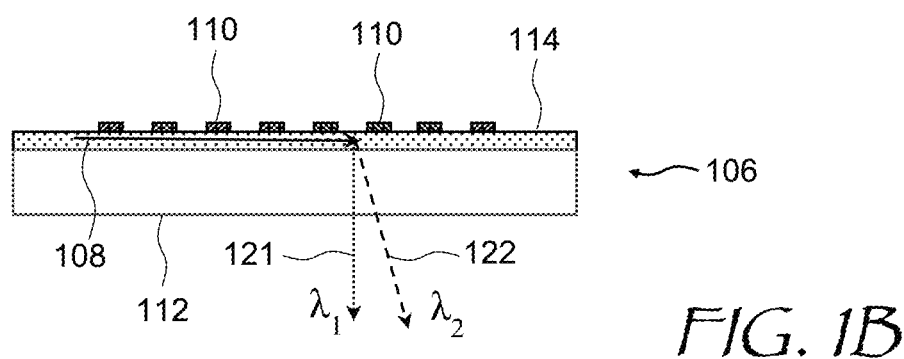
FIG. 1B is a side cross-sectional view of the low-mode waveguide of FIG. 1A.

FIG. 1B shows an embodiment of the low-mode waveguide 106 in a side cross-sectional view. The low-mode waveguide 106 includes a substrate 112 supporting a thin waveguide layer 114 in which the light 108 propagates. Depending on refractive index contrast and thickness of the waveguide layer 114, only one mode or several, e.g. up to 10 modes, may propagate in the thin waveguide layer 114. Thus, the term "low-mode" waveguide is defined herein to mean a waveguide supporting up to 10 different lateral modes of propagation. The light 108 propagates in plane of the waveguide 106 i.e. XY plane, but is constrained, or guided, in Z-direction.

Figure 1C:
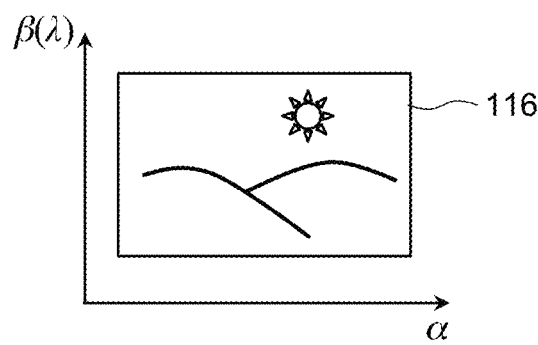
FIG. 1C is a schematic diagram illustrating rendering of an image by the device of FIG. 1A.

The wavelength-selective out-coupler 110 out-couples the image 108 at different angles depending on wavelength. For example, a first spectral 121 component at a wavelength $\lambda_1$ is out-coupled at a straight angle to the low-mode waveguide 106, and a second spectral component 122 at a wavelength $\lambda_2$ is out-coupled at an acute angle to the low-mode waveguide 106. The spectral composition of the light 108 provided by the light source 102, as well as the angular dispersion of the wavelength-selective out-coupler 110, are selected so as to provide the desired angular distribution of brightness $I(\alpha,\beta(\lambda))$. By way of a non-limiting example, referring to FIG. 1C, an entire image 116 in angular domain may be formed. The image 116 is represented by the angular distribution of brightness $I(\alpha,\beta(\lambda))$.

Figure 2:
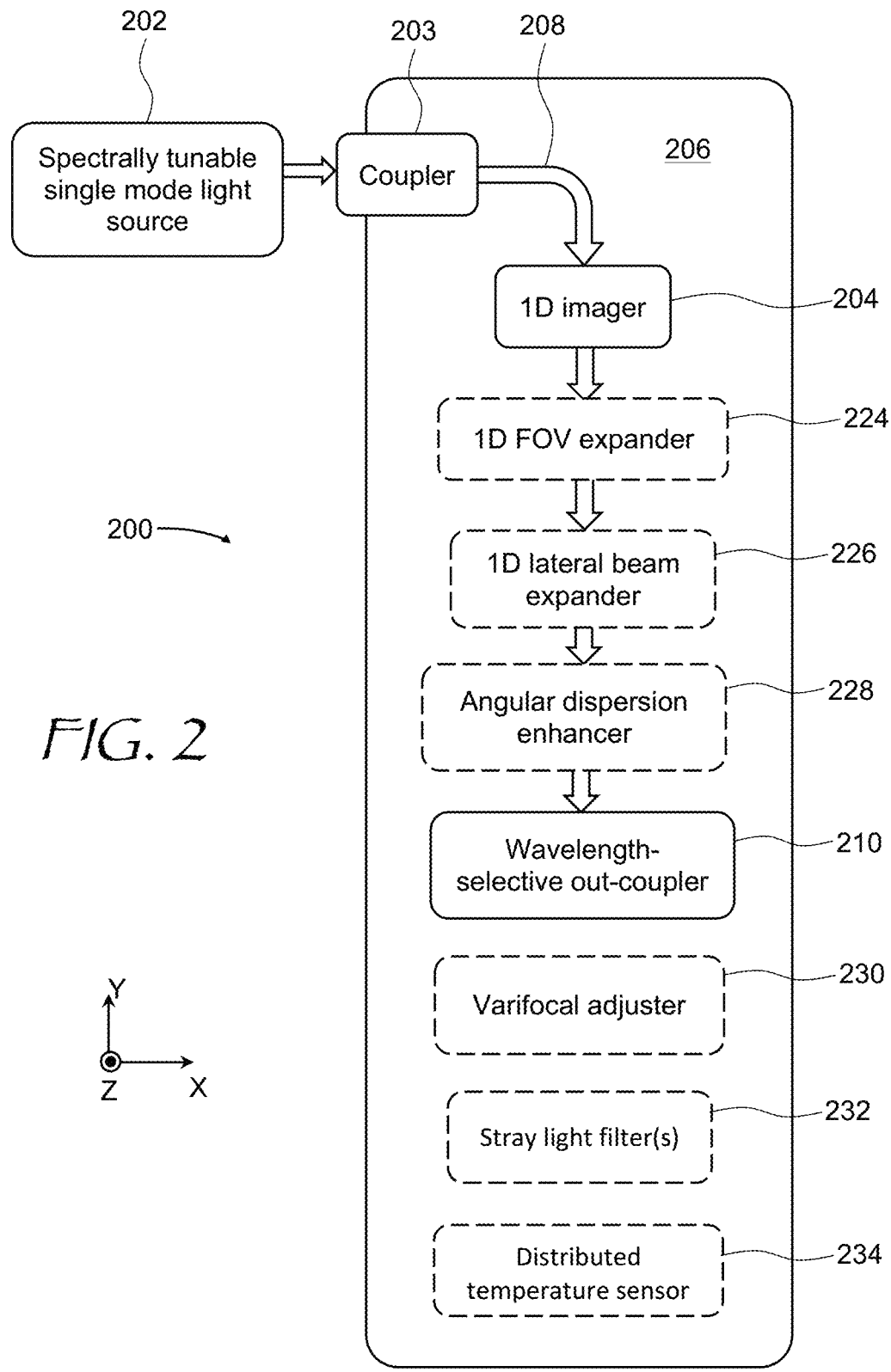
FIG. 2 is a system-level block diagram of an embodiment of the device of FIGS. 1A and 1B.

Referring to FIG. 2, a device 200 is an example implementation of the device 100 of FIGS. 1A and 1B. The display device 200 of FIG. 2 includes serially optically coupled: a spectrally tunable singlemode light source 202, an in-coupler 203, an 1D imager 204, the following optional modules: 1D FOV expander 224, 1D lateral beam expander 226, and angular dispersion enhancer 228; and an out-coupler 210. Other elements may also include a varifocal adjuster 230, a stray light filter 232, and a distributed temperature sensor 234. Optional elements are shown in dashed round-corner rectangles. All or some of the elements may be a part of a low-mode waveguide 206, e.g. may be formed in or on the low-mode waveguide 206. It is to be noted that the low-mode waveguide 206 may include a section with linear waveguides, i.e. straight or curved ridge-type waveguides guiding light in two dimensions, and a slab waveguide section, guiding light in only one dimension, i.e. Z-direction in FIG. 2, while allowing free propagation in XY plane. The order of coupling of the elements shown in FIG. 2 may vary.

In operation, the spectrally tunable singlemode light source 202 provides image light 208 having a tunable optical spectrum, which is a function of the desired angular distribution of brightness $I(\alpha\beta(\lambda))$ as explained above. The coupler 203 couples the image light 208 into the 1D imager 204. The 1D imager 204 receives the image light 208 from the light source 202 and redirects or angularly disperses the image light 208, scans a collimated beam of the image light 208, etc. The 1D FOV expander 224 may be configured to switch the image light 208 between a plurality of conterminous FOV portions to enhance or broaden the spread of light. The 1D lateral beam expander 226 increases a width of collimated portions of the image light in the XY plane, i.e. broadens the image light 208 beam in plane of the low-mode waveguide 206 thereby increasing the lateral size of the eyebox of the display device 200. Herein, the term "eyebox" means a geometrical area where an image of acceptable quality may be observed by a user of the display device 200. The angular dispersion enhancer 228 increases the spectral dispersion of the image light 208, to arrive at the desired second 1D angular distribution of brightness $I(\beta)$ when out-coupled by the wavelength-selective out-coupler 210. The varifocal adjuster 230 may adjust convergence or divergence of the out-coupled image light to vary the perceived depth of focus. The stray light filter 232 may remove or lessen portions of the image light out-coupled not to the eyes of the user but outwards to the external world. The distributed temperature sensor 234 may obtain a temperature distribution across the low-mode waveguide 206 to provide corrections and to operate thermally-driven optical elements and components. More details will be given below.

Figure 3:
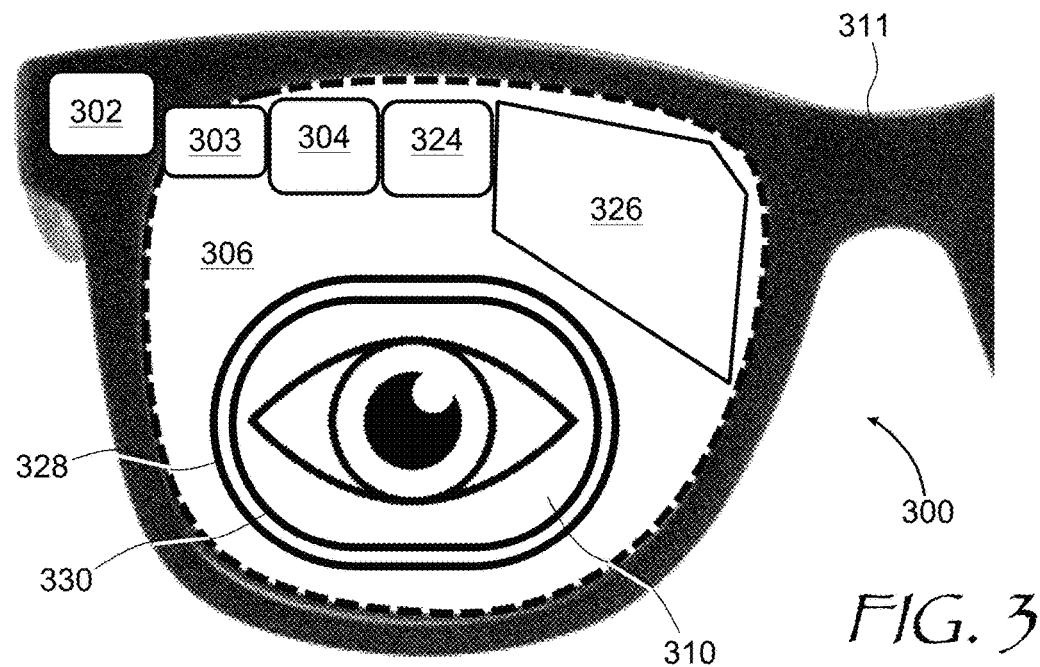
FIG. 3 is a schematic frontal view of a near-eye display embodiment of the device of FIG. 2.

Referring to FIG. 3, a display device 300 is an implementation of the device 100 of FIG. 1 or the device 200 of FIG. 2. The display device 300 of FIG. 3 is a near-eye display device having a form factor of a pair of eyeglasses 311, with a low-mode waveguide 306 occupying a lens area of the eyeglasses. The display device 300 of FIG. 3 includes serially optically coupled: a light source 302, a coupler 303, an 1D imager 304, a 1D FOV expander 324, a 1D lateral beam expander 326, an angular dispersion enhancer 328, an out-coupler 310, and a varifocal adjuster 330. All elements may be implemented in the low-mode waveguide 306. The light source 302 may be disposed separately, as shown.

Figure 4A:
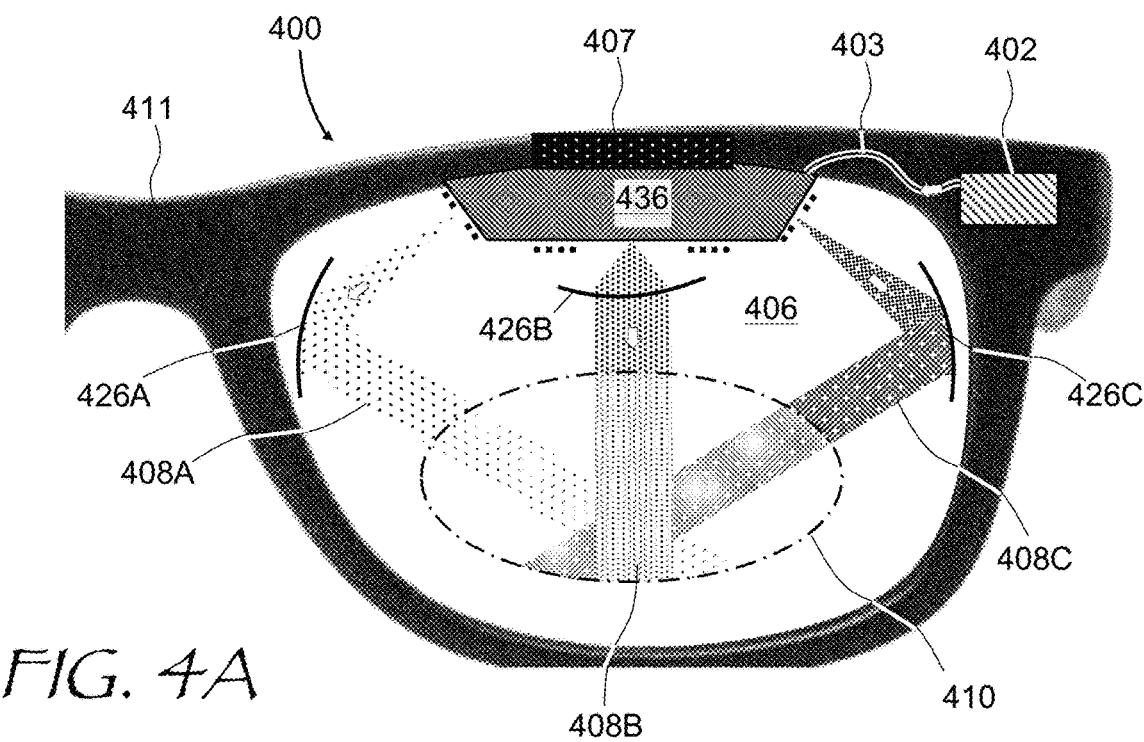
FIG. 4A is a schematic frontal view of a photonic integrated circuit (PIC) embodiment of the near-eye display of FIG. 3.
Figure 4B:
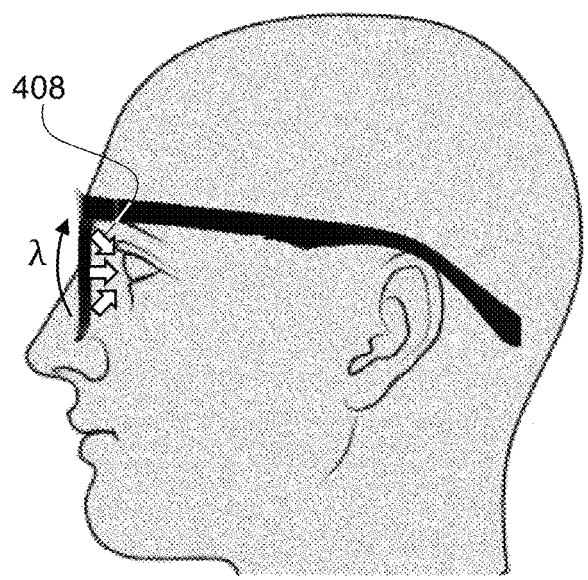
FIGS. 4B and 4C are side and top views, respectively, of a person wearing the near-eye display device of FIG. 4A.
Figure 4C:
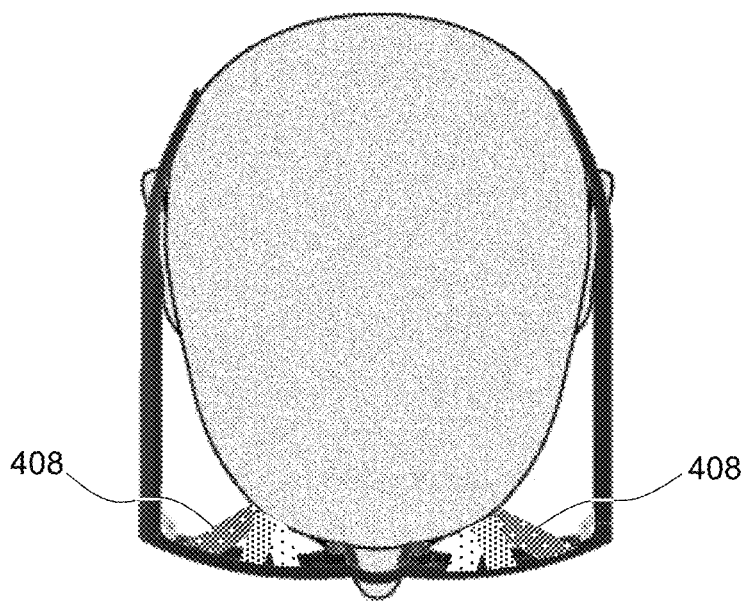

Referring to FIG. 4A, a display device 400 is an implementation of the device 100 of FIG. 1, the device 200 of FIG. 2, or the display device 300 of FIG. 3. The display device 400 of FIG. 4A is a near-eye display device having a form factor of a pair of eyeglasses 411, with active components/features implemented in a PIC portion 436 of a waveguide 406. The PIC portion 436 may be driven by an integrated circuit (IC) driver unit 407. The display device 400 includes a light source 402 having a tunable emission spectrum, coupled to the PIC portion 436 via an optical fiber 403. The PIC portion 436 may include, for example, a 1D imager and/or a 1D FOV expander. Light beams 408A, 408B, and 408C (collectively 408) formed in the LC portion 436 are expanded by in-waveguide optical elements 426A, 426B, and 426C respectively, having optical power (i.e. focusing/defocusing power) for collimating/redirecting the light beams 408A, 408B, and 408C towards a highly dispersive output grating 410. The function of the highly dispersive output grating 410 is to provide the out-coupling of image light 408 at different vertical angles to provide a vertical FOV, as illustrated in FIG. 4B. The horizontal FOV shown in FIG. 4C is provided by the PIC portion spreading the image light 408 in-plane of the waveguide 406.

Various implementations of different modules depicted in FIGS. 1, 2, 3, and 4A will now be considered.

Figure 5:
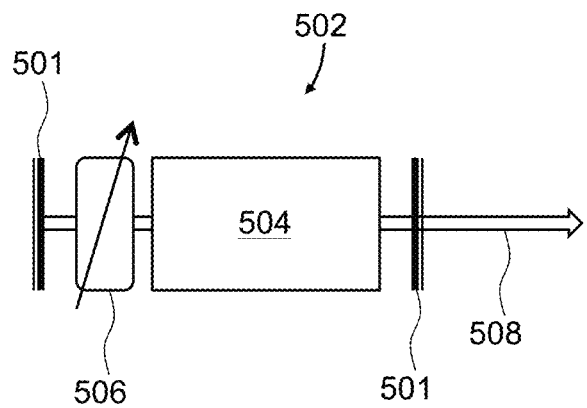
FIG. 5 is a schematic side view of a wavelength-tunable light source including an intracavity spectrally selective element.

Referring first to FIG. 5, a tunable laser source 502 may be used as a wavelength-tunable light source for a display device of this disclosure. The tunable laser source 502 includes an optical cavity formed by a pair of mirrors 501, a gain medium 504, and a wavelength-selective intracavity element 506 having a transmission peak tunable within a gain spectral band of the gain medium 504. The transmission peak of the wavelength-selective element 506 may be scanned in coordination with scanning an 1D angle of a collimated beam of light 508 to provide the required 2D FOV of the display device, with e.g. horizontal FOV provided by the beam scanning, and vertical FOV provided by the output wavelength scanning of the tunable laser source 502.

Figure 6A:
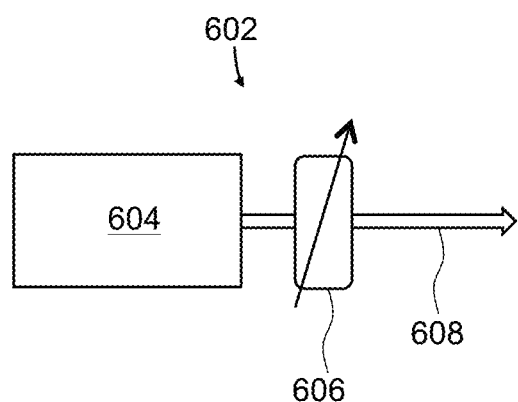
FIG. 6A is a schematic side view of a tunable-spectrum light source including an external dynamic spectrally selective element.
Figure 6B:
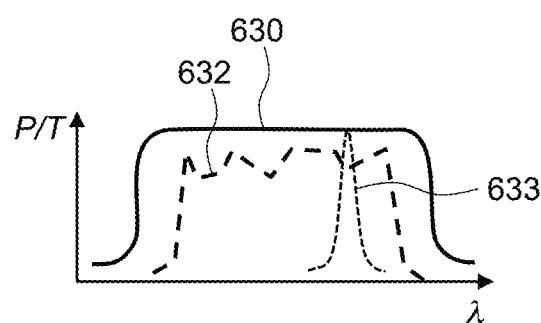
FIG. 6B is an output spectrum of the source of light superimposed with a transmission spectrum of the spectrally selective element, for illustrating the principle of operation of the tunable spectrum light source of FIG. 6A.

Turning to FIG. 6A, a tunable-spectrum light source 602 may be used as a wavelength-tunable light source for a display device of this disclosure. The tunable spectrum light source 600 includes a broadband source 604 of light 608 coupled to a dynamic spectral filter 606 having a selectable arbitrary spectral shape. Emission spectrum 630 of the broadband source 604 is illustrated in FIG. 6B, where it is overlapped with an example broadband spectral shape 632 of the dynamic spectral filter 606, or an example narrowband (single-wavelength) spectral shape 633 of the dynamic spectral filter 606.

Dynamic spectral filter 606 may be configured to independently adjust transmission of a single or a plurality of adjacent narrow spectral bands or channels. For example, the dynamic spectral filter 606 may adjust the shape of the broadband spectral shape 632 in accordance with the desired angular distribution of brightness at the output of the display device. In some embodiments, the narrowband spectral shape 633 may be scanned in wavelength, which results in the output light beam being scanned angularly in accordance with the dispersion function of the out-coupler of the display device.

Figure 6C:
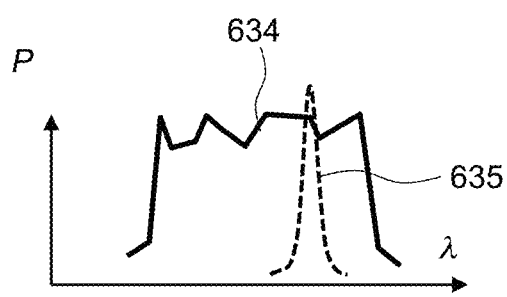
FIG. 6C is an output spectrum of the light source of FIG. 6A.

Resulting output spectra are shown in FIG. 6C. For example, the broadband spectral shape 632 results in a broadband emission spectrum 634, and the narrowband spectral shape 633 accordingly results in a narrowband emission spectrum 635, the emission wavelength being tunable by the dynamic spectral filter 606.

Figure 7:
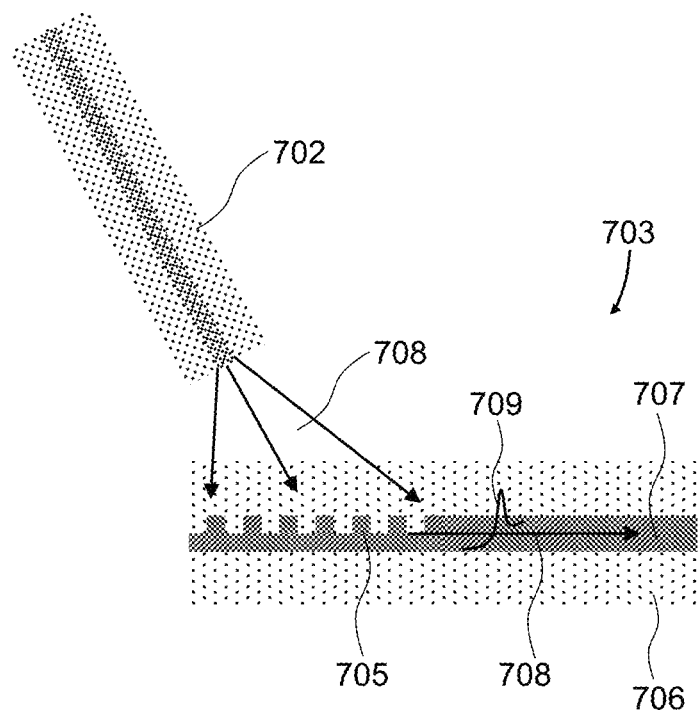
FIG. 7 is a side cross-sectional view of a free-space grating coupler for coupling light into a waveguide.

Referring to FIG. 7, a free-space grating coupler 703 may be used to couple light from a tunable-spectrum light source 702A, such as the tunable laser source 502 of FIG. 5 or a tunable-spectrum light source 602 of FIG. 6A, into a waveguide or PIC of a display disclosed herein. The free-space grating coupler 703 includes a plurality of grating lines 705 that receive image light 708 and couple the image light 708 into a core 707 of a waveguide 706. The grating lines 704 run parallel to each other and may be straight or curved, e.g. may have shapes of concentric arc sections running perpendicular to the plane of FIG. 7. The concentric arc shape provides focusing of the image light 708, matching its mode size to a size of an optical mode 709 that can propagate in the core 707 of the waveguide 706.

Figure 8:
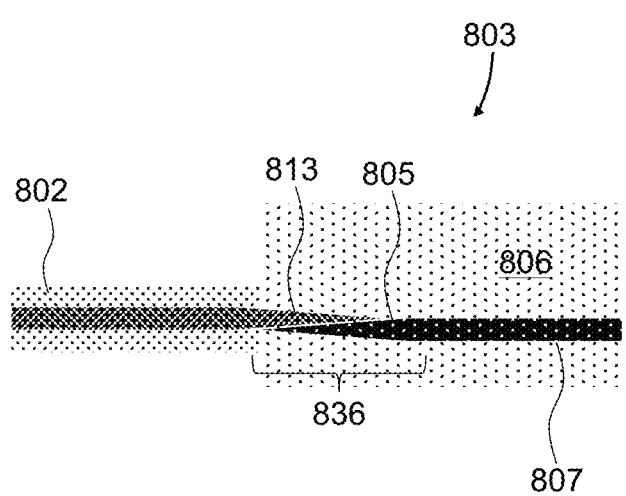
FIG. 8 is a side cross-sectional view of an adiabatic waveguide coupler for coupling light into a waveguide.

Turning to FIG. 8, a waveguide coupler 803 may be used to couple light from a tunable-spectrum, waveguide-based or fiber-coupled light source into a waveguide or PIC of a display of this disclosure. The waveguide coupler 803 includes a tapered section 836 where a tapered core 813 of a source optical fiber 802 is disposed in close proximity and parallel to a tapered waveguide core 805 of a waveguide 806 having a waveguide core 807. The tapered section 836 may be long enough to ensure an adiabatic transition of optical energy from the source optical fiber 802 into a waveguide core 807 of the waveguide 806.

Figure 9:
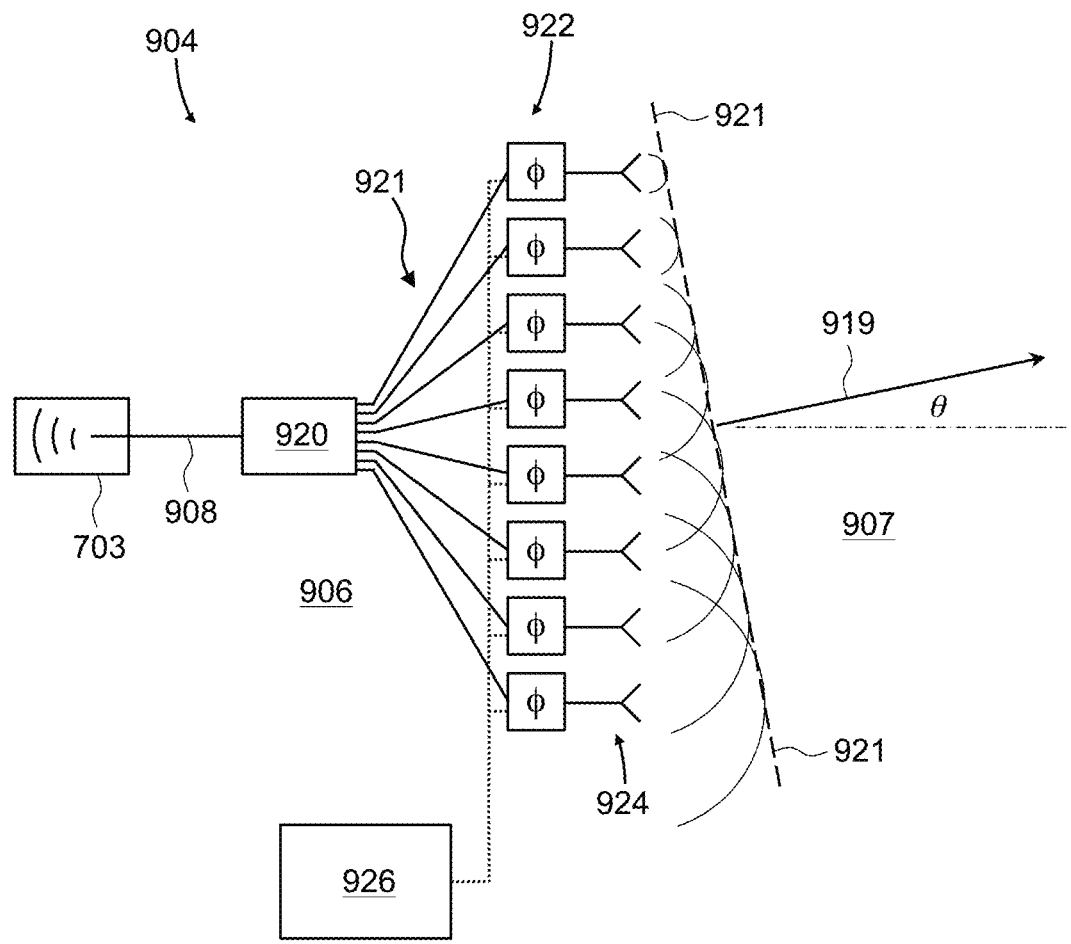
FIG. 9 is a schematic view of a phased array 1D imager of this disclosure.

Referring to FIG. 9, a phased array 1D imager 904 is an embodiment of the 1D redirector/imager 104 of FIG. 1, the 1D imager 204 of FIG. 2, or the 1D imager 304 of FIG. 3. The phased array 1D imager 904 of FIG. 9 includes a 1×N power splitter 920, N phase shifters 922 coupled to the power splitter 920, and an array of N linear waveguide emitters 924 coupled to the phase shifters 922. Throughout this specification, the term "linear waveguide" denotes a waveguide that bounds the light propagation in two dimensions, like a light wire. A linear waveguide may be straight, curved, etc.; in other words, the term "linear" does not mean a straight waveguide section. One example of a linear waveguide is a ridge-type waveguide. All elements of the phased array 1D imager 904 may be implemented in a low-mode waveguide 906 including a slab waveguide portion 907. The number N may vary between 4 and 16,000, for example.

In operation, an in-coupler, e.g. the free-space grating coupler 703, receives image light 908 from a wavelength-tunable laser source, not shown in FIG. 9, and couples the image light 908 into the power splitter 920. The power splitter 920 distributes the image light 908 between N linear waveguides 921 of the low-mode waveguide 906, each linear waveguide 921 carrying a portion of the image light 908. Each image light portion is shifted in phase, or delayed, by a corresponding phase shifter 922, based on a control signal provided by a controller 926. The image light portions are emitted by the array of N linear waveguide emitters 924 with a phase profile corresponding to a desired beam angle υ, forming an output beam 919 having a phase front 921. The output beam 919 propagates in a slab waveguide portion 907. In some embodiments, the phase profile in 922 may be controlled to suppress all diffraction orders but one, such that all energy is concentrated into a single steered beam.

Figure 10A:
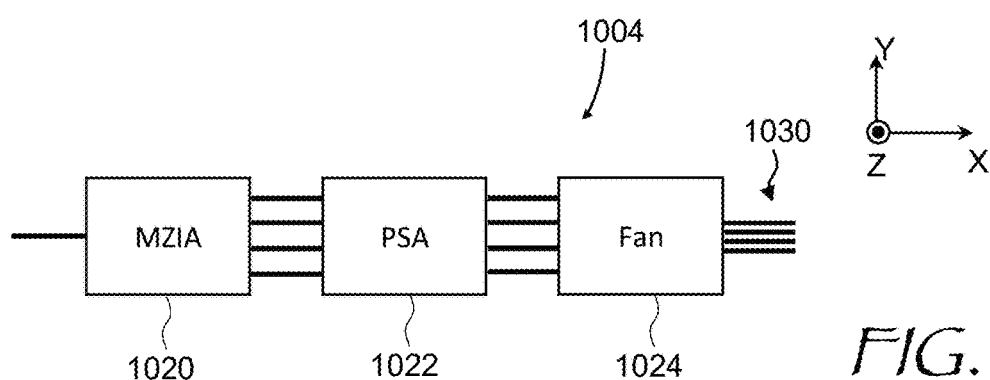
FIG. 10A is a schematic top view of a PIC implementation of the phased array 1D imager of FIG. 9.

Turning to FIG. 10A, a PIC phased array 1D imager 1004 is an example implementation of the phased array 1D imager 904 of FIG. 9. The PIC phased array 1D imager 1004 of FIG. 10 includes a Mach-Zehnder interferometers array (MZIA) 1020 operating as the splitter 920, a PIC phase shifter array (PSA) 1022 coupled to the MZIA 1020, and a waveguide concentrator 1024 coupled to the PIC phase shifter array 1022. Ends of output linear waveguides 1030 of the waveguide concentrator 1024 operate as the antennae 924 (FIG. 9) emitting light that propagates freely in plane of the slab waveguide portion (XY plane in FIG. 10A), while remaining bound in a direction perpendicular to the slab waveguide (Z-direction in FIG. 10A).

Figure 10B:
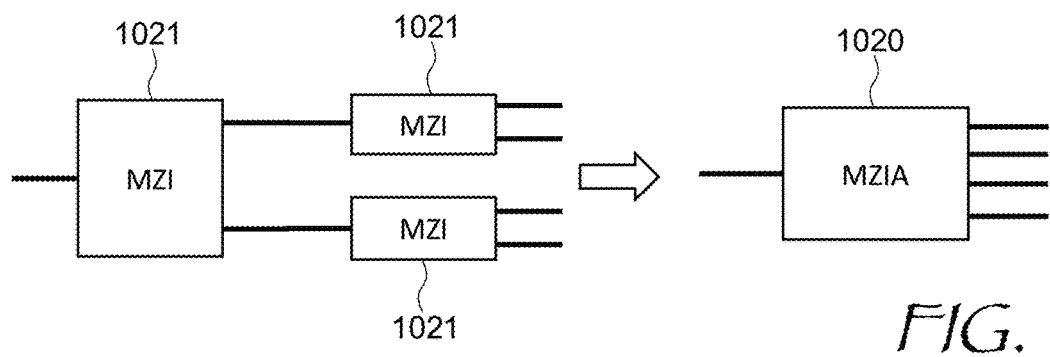
FIG. 10B is a schematic top view of a PIC implementation of a Mach-Zehnder interferometer (MZI) array (MZIA) of the PIC 1D imager of FIG. 10A.
Figure 10C:
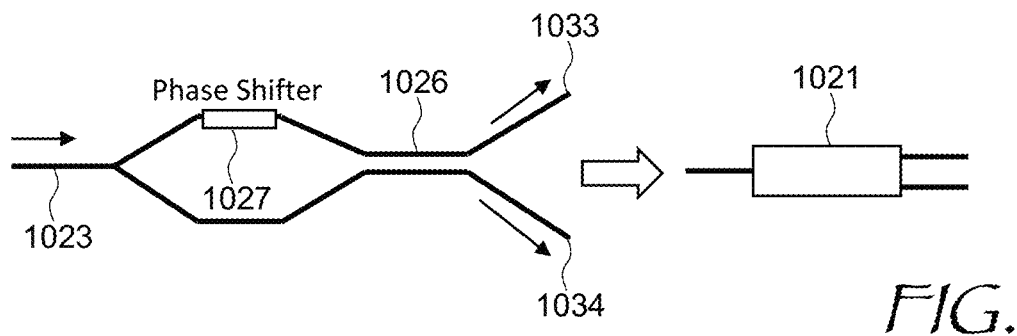
FIG. 10C is a schematic top view of an individual MZI of FIG. 10B.

The MZIA 1020 may include a binary tree of passive Y-splitters and/or active Mach-Zehnder interferometers (MZIs) 1021, as shown in FIG. 10B. Each MZI may include one input 1023 and two outputs 1033, 1034 of an evanescent coupler 1026 as illustrated in FIG. 10C, or two inputs (one of which is idle) and two outputs, being two waveguide sections coupled by evanescent couplers at two locations. The function of the MZIA 1020 is to split the image light into N portions. In embodiments where passive Y-splitters are used, the PSA 1022 may be used to scan a collimated beam. In implementations where active MZIs are used, phase shifters 1027 in at least one of the two branches of the MZI (FIG. 10C) may be used to control optical power distribution at the outputs to not equal optical powers if required, e.g. to provide apodization of the scanned collimated beam, or even create a full desired 1D angular profile.

Figure 10D:
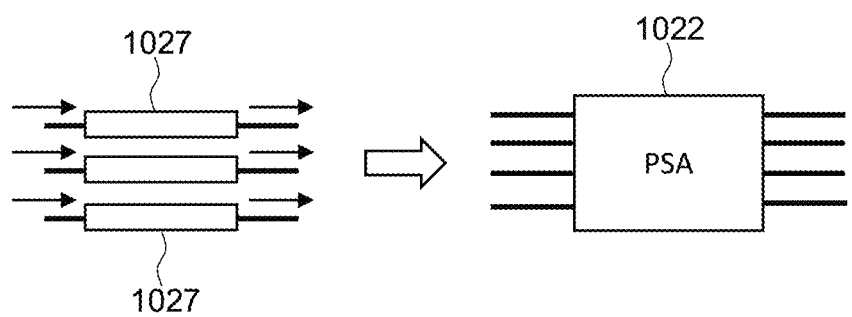
FIG. 10D is a schematic top view of a phase shifter array (PSA) of the PIC 1D imager of FIG. 10A.

Referring to FIG. 10D, the phase shifter array 1022 may include a plurality of phase shifters 1027 providing a controllable amount of phase shift, or delay, to light propagating therein. The phase shifters 1027 may be, for example, thermo-optic shifters based on thermo-optic effect, electro-optic shifters based on Pockels and/or Kerr effect, and/or electro-absorption phase shifters based on electro-absorption effect in semiconductors, and accordingly may include heaters and/or electrodes over the waveguides, as required.

Figure 10E:
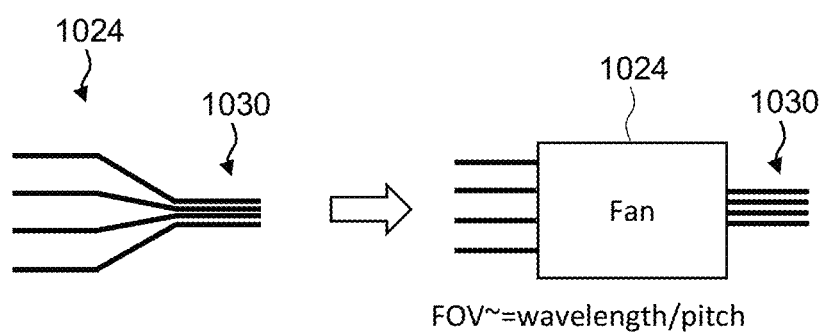
FIG. 10E is a schematic top view of an implementation of a waveguide fan of the PIC 1D imager of FIG. 10A.

Turning to FIG. 10E, the waveguide concentrator 1024 includes an array of waveguides fanning in or out to achieve a required output pitch. Typically, the output pitch needs to be small enough to enable large FOV. The FOV is approximately equal to a ratio of emission wavelength to pitch of the output linear waveguides 1030.

Figure 11:
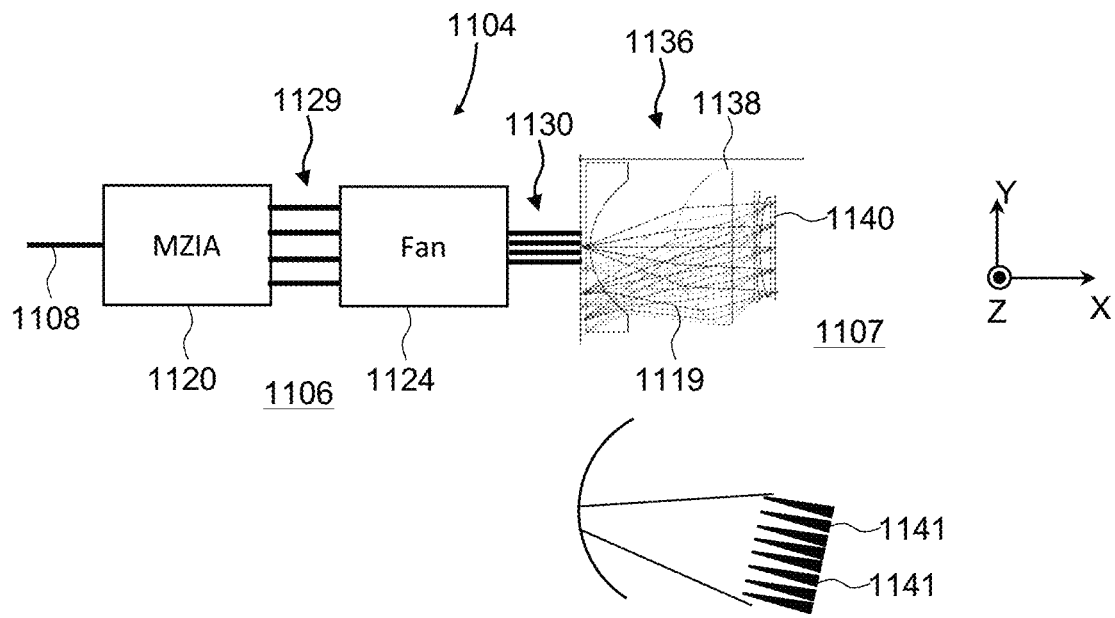
FIG. 11 is a schematic top view of a hybrid 1D imager including 1D lenses etched in the waveguide.

Referring to FIG. 11, a hybrid 1D imager 1104 is an example implementation of the 1D redirector 104 of FIG. 1, the 1D imager 204 of FIG. 2, or the 1D imager 304 of FIG. 3. The hybrid 1D imager 1104 of FIG. 11 includes a MZIA 1120, a waveguide concentrator 1124 coupled to the MZIA 1120, and an FOV collimator 1136 coupled to the waveguide concentrator 1124 implemented in a low-mode waveguide 1106. The MZIA 1120 functions as 1×N distributor or switch, where N is the number of output MZIA waveguides 1129. The MZIA 1120 may include, for example, a binary tree of Mach-Zehnder switches for switching image light 1108 between N linear output waveguides. The waveguide concentrator 1124 brings its output linear waveguides 1130 closer together than the output MZIA waveguides 1129. Ends of the output linear waveguides 1130 of the waveguide concentrator 1124 are disposed at a focal plane of the FOV collimator 1136, which is located in a slab waveguide portion 1107 of the few-mode waveguide 1106. The FOV collimator 1136 is a collimating element disposed one focal length away from the ends of the output linear waveguides 1130 of the waveguide concentrator 1124. The function of the FOV collimator 1136 is to convert position, or Y-offset, of the ends of the output linear waveguides 1130 of the waveguide concentrator 1124 into a beam angle of a corresponding output light beam 1119 propagating in the slab waveguide portion 1107. In other words, the FOV collimator 1136 operates as an offset-to-angle optical element converting an offset, or the Y-position, of a selected one of the output waveguides 1130 carrying a portion of the image light 1108 into an angle of the output light beam 1119 originating from the image light portion propagated in the selected output waveguide.

The FOV collimator 1136 may be a single element such as lens or mirror, or may include a plurality of lenses 1138, 1140, as shown in FIG. 11. The lenses 1138, 1140 may be formed in the low-mode waveguide 1106 by etching, and may have s folded configuration such as a pancake lens configuration, for example. Output light beam 1119 may be reshaped, focused, collimated, etc., in the plane of the waveguide (XY plane), while remaining guided by the slab waveguide portion 1107, i.e. while remaining constrained in Z-direction. The lens surfaces may include a plurality of tapers 1141 with subwavelength periodicity to facilitate an adiabatic transition between etched and non-etched part of the waveguide and in so doing prevent an out of plane light scattering.

Figure 12:
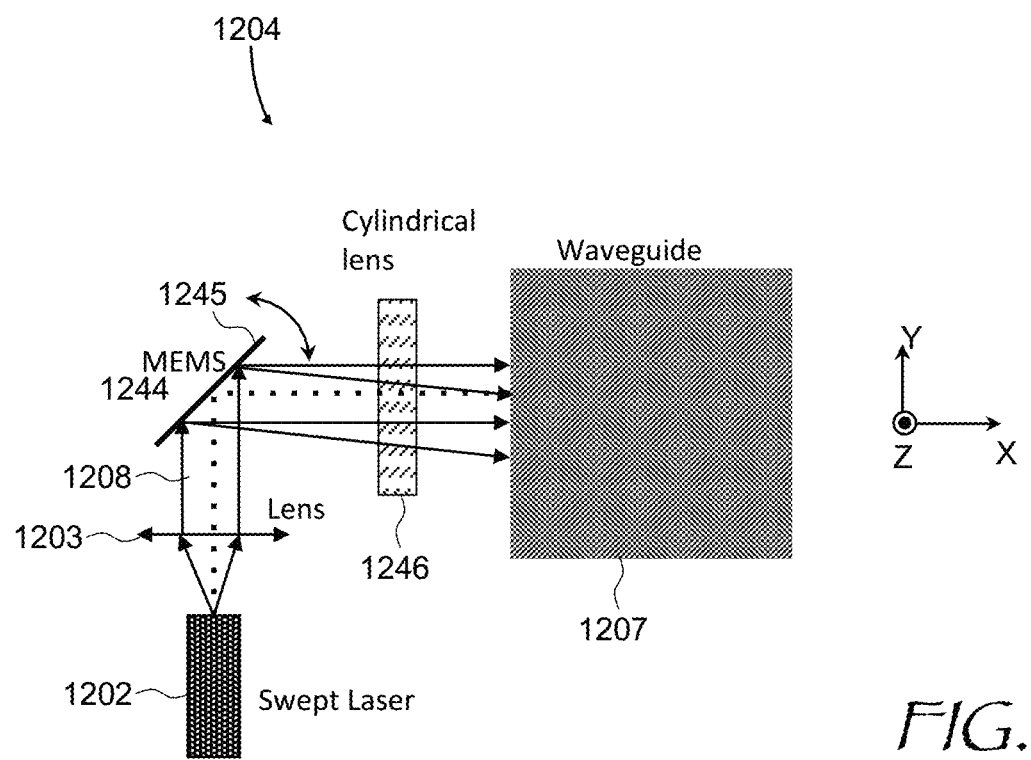
FIG. 12 is a schematic view of a free-space optics (FSO) implementation of a 1D scanner including a microelectromechanical system (MEMS) tiltable reflector.

Referring to FIG. 12, a free-space optics (FSO) 1D scanner 1204 includes a microelectromechanical system (MEMS) beam scanner 1244 with a tiltable reflector 1245 and a cylindrical lens 1246. In operation, a multi-wavelength light source, such as a wavelength-swept laser source 1202, emits a light beam 1208 at a tunable, e.g. linearly swept, emission wavelength. The light beam 1208 is focused by the cylindrical lens 1203 onto the MEMS tiltable reflector 1245. The cylindrical lens 1246 functions as a coupler receiving the image light 1208 scanned by the MEMS beam scanner 1244 and coupling the image light 1208 to a low-mode slab waveguide 1207. The cylindrical lens 1203 may be refractive or diffractive, for example. Other types of couplers such as mirrors, for example, may be used. The MEMS tiltable reflector 1245 reflects the light beam 1208 at a variable angle, as shown by a double-headed arrow. The cylindrical lens 1246 has focusing power in XZ plane, while propagating the light beam 1208 substantially without focusing in XY plane. The cylindrical lens 1246 focuses the light beam 1208 onto an edge of the low-mode slab waveguide 1207 or onto a grating coupler formed in the low-mode slab waveguide 1207. The light beam 1208 gets coupled into the low-mode slab waveguide 1207 and propagates freely in the low-mode slab waveguide 1207 in XY plane, being confined in Z-direction perpendicular to a plane of the low-mode slab waveguide 1207. The cylindrical lens 1246 needs to be precisely parallel to the low-mode slab waveguide 1207 for efficient coupling.

Figure 13A:
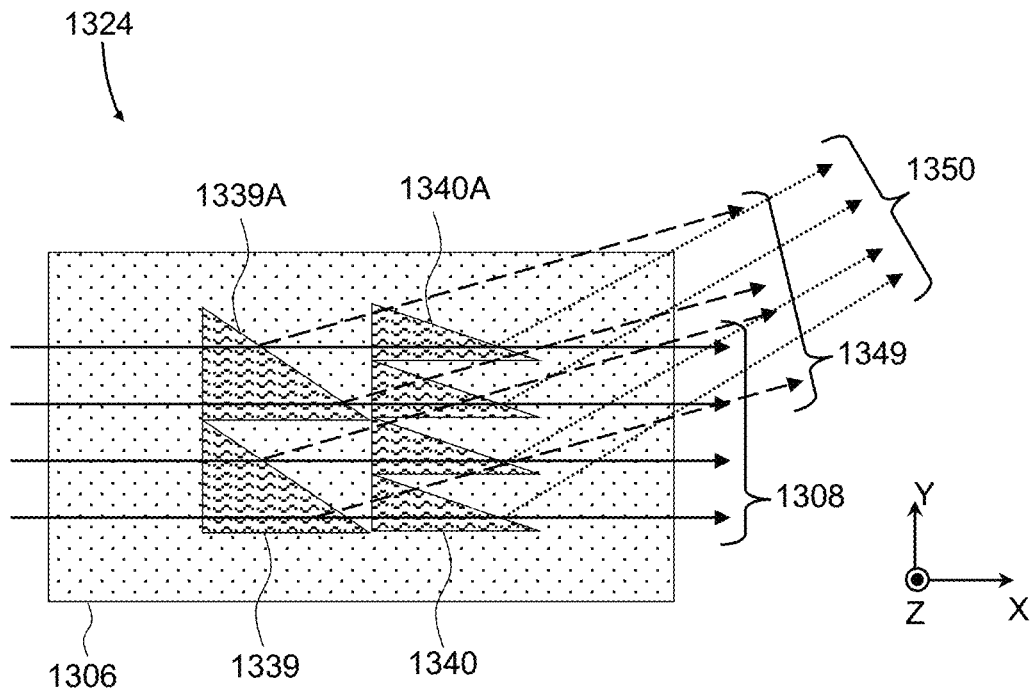
FIG. 13A is a top schematic view of a field of view (FOV) expander based on liquid crystal (LC) cladding waveguides.
Figure 13B:
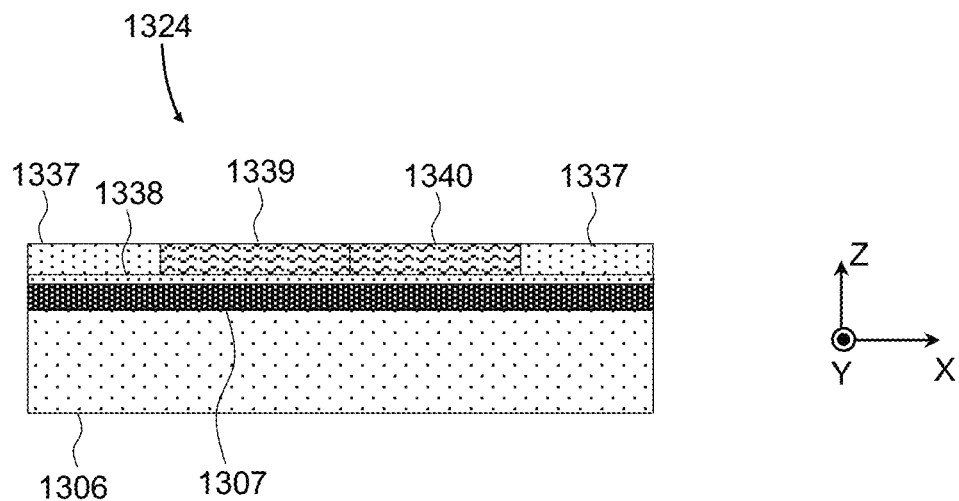
FIG. 13B is a side cross-sectional view of the FOV expander of FIG. 13A.

Turning to FIGS. 13A and 13B, a liquid crystal (LC) 1D FOV expander 1324 is an embodiment of the 1D FOV expander 224 of FIG. 2 and the 1D FOV expander 324 of FIG. 3. The LC 1D FOV expander 1324 of FIGS. 13A and 13B includes a slab waveguide 1306 having a core 1307 for guiding image light 1308 in the core 1307 while allowing the image light 1308 to freely propagate in XY plane, as depicted. A top cladding 1337 includes tunable cladding portions 1339, 1340 evanescently coupled to the core 1307 of the slab waveguide 1306 and shaped to deviate light propagated in the core 1307 of the slab waveguide 1306 by a controllable amount. In the embodiment shown in FIG. 13A, the tunable cladding portions 1339, 1340 have sawtooth shapes in XY plane, e.g. an array of triangular shapes, as shown in FIG. 13A. The array extends laterally w.r.t. an optical path of the image light in the core 1307 of the slab waveguide 1306. At least some triangular-shaped tunable cladding portions have a side 1339A, 1340A extending at an acute angle w.r.t. the optical path represented by horizontal arrows in FIG. 13A. An underlayer 1338 (FIG. 13B) may be provided under the tunable cladding portions 1339, 1340 to avoid a direct contact between the tunable cladding portions 1339, 1340 and the waveguide core 1307. The underlayer 1338 may be thin enough to ensure the evanescent coupling of the light propagating in the core 1307 with the tunable cladding portions 1339, 1340.

The tunable cladding portions 1339, 1340 of the top cladding 1337 include liquid crystal (LC) LC material that changes its refractive index for light of a certain polarization upon application of electric field to the tunable cladding portions 1339, 1140. When refractive index of the LC tunable cladding portions 1339, 1140 of the top cladding 1337 changes, the effective refractive index of the slab waveguide 1306 changes as well, causing the image light 1308 to deviate from the original direction of propagation due to a Fresnel refraction on the tilted faces of the LC tunable cladding portions 1339, 1140. The magnitude of the deviation depends on the angle of the tilted faces and the vertical pitch (in Y-direction) of the LC tunable cladding portions 1339 and 1340. The distribution of energy in directions 1349 and 1350 depends on the switching state of the LC tunable cladding portions 1339 and 1340, which may be operated in binary mode, ON/OFF. Each array of the LC tunable cladding portions 1339 and 1340 may offset the 1D FOV by a discrete amount when the LC tunable cladding portions 1339 and 1340 are not be continuously tunable. Therefore, a cascade of m LC elements would yield $2^m$ combinations of 1D FOV offsets. By energizing different triangular LC tunable cladding portions 1339, 1340, the image light 1308 may be deviated at different angles. For example, energizing larger triangular shapes 1339 deviates the image light 1308 to propagate at an angle as shown at 1349, and energizing shallower triangular shapes 1340 deviates the image light 1308 to propagate at a steeper angle, as shown at 1350. More arrays of LC portions with different deviation angles may enable a more precise angle control. When different triangular shapes of the LC tunable cladding portions 1339, 1340 are energized in coordination with operating the 1D imager or scanner, the image light is switched between a plurality of conterminous FOV portions, enabling effective controllable light spread and associated horizontal FOV to be expanded, or enhanced.

Figure 14:
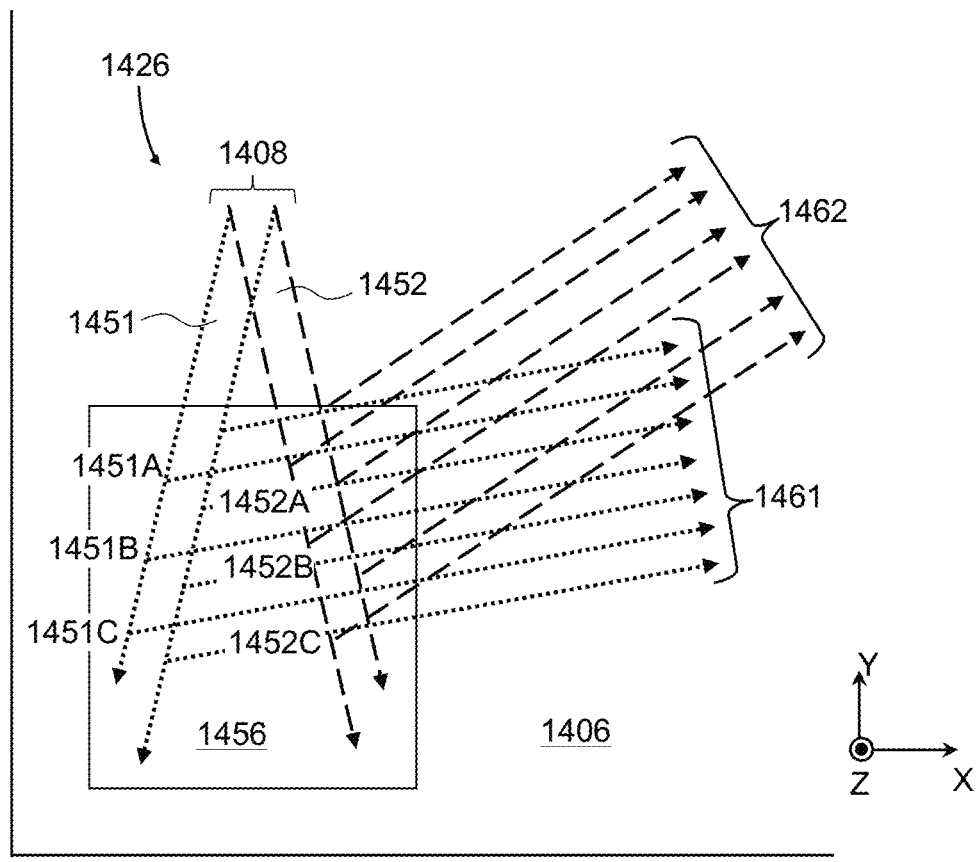
FIG. 14 is a schematic top view of a hologram-based beam expander in accordance with this disclosure.

Referring to FIG. 14, a holographic beam expander 1426 includes a hologram 1456 in a low-mode slab waveguide 1406 enabling propagation of image light in plane of the slab waveguide 1406 in two dimensions, i.e. in XY plane. The hologram 1456 is configured to receive image light 1408 including at least one collimated beam portion, e.g. first (1451; dotted lines) and second (1452; dashed lines) collimated beam portions propagating at an angle to each other, and to reflect each collimated beam portion at a plurality of locations along an optical path of the collimated beam portion in the hologram 1456. For example, the first collimated beam portion 1451 is reflected at a plurality of locations 1451A, 1451B, 1451C at a first angle, producing a first output beam (1461; dotted lines); and the second collimated beam portion 1452 is reflected at a plurality of locations 1452A, 1452B, 1452C at a second angle, producing a second output beam (1462; dashed lines). Any other light beams are reflected at beam angles between the first and second angles, propagating in a plurality of directions between the directions of the first 1461 and second 1462 output beams. To that end, the hologram 1456 may include a plurality of fringes configured to ensure reflection in the desired directions, depending on the impinging beam angles. It is seen from FIG. 14 that such a reflection geometry leads to expansion of the light beams 1451, 1452.

Figure 15:
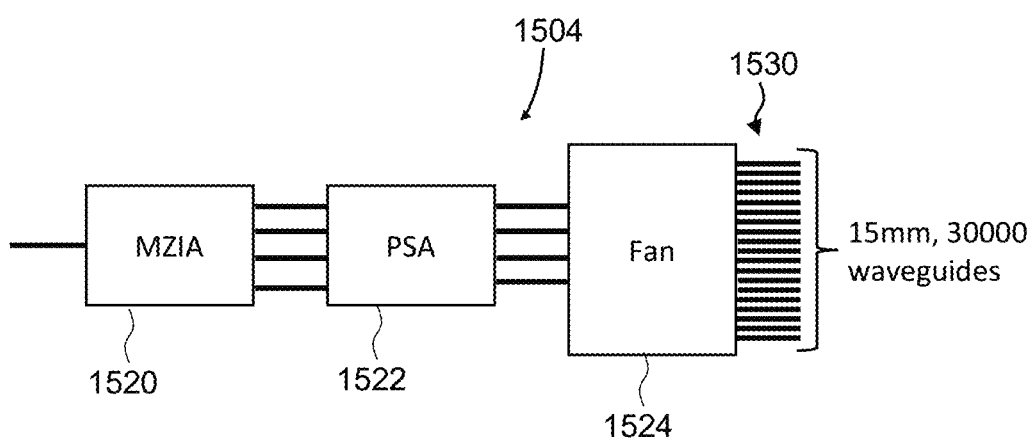
FIG. 15 is a schematic top view of a PIC implementation of a phased array 1D imager with a beam expander.

Turning to FIG. 15, a wide-beam PIC phased array 1D imager 1504 is similar to the PIC phased array 1D imager 1004 of FIG. 10A, but includes many more linear waveguides in a MZIA 1520 and a PSA 1522 (FIG. 15). An output waveguide array coupler or beam expander 1524 is similar to the concentrator 1024, but includes many more output linear waveguides 1530, e.g. 10,000; 20,000; 30,000 or more waveguides spanning over 5 mm; 10 mm; or 15 mm of lateral distance, as the case may be. The output beam may be as wide as the width of the linear waveguide 1530 array, and thus may not require any subsequent beam expansion and collimation to expand the output beam over an eyebox of a near-eye display, simplifying the overall design.

Figure 16:
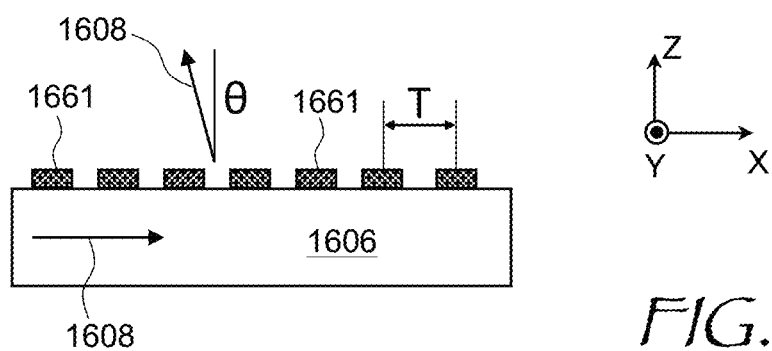
FIG. 16 is a side cross-sectional view of an output waveguide for illustration of angular dispersion calculation.

Referring now to FIG. 16, a slab waveguide 1606 supports a diffraction grating 1661 for diffracting out a portion of image light 1608 propagating in the XY plane of the slab waveguide 1606. A K-vector of the diffraction grating 1661 is aligned with the x-component of the K-vector of the image light 1608. A diffraction angle θ of the image light 1608 follows the equation $$\sin\theta = n - \frac{\lambda}{T} \quad (1)$$

where n is refractive index, T is grating period and λ is the wavelength of light in the propagation medium. Accordingly, $$\frac{d\theta}{d\lambda} = \left(\frac{1}{\cos(\theta)}\right) * \left(\frac{dn}{d\lambda} - \frac{1}{T}\right) = \left(\frac{1}{\cos(\theta)}\right) * \left(\frac{n - n_{gr}}{d\lambda} - \frac{1}{T}\right) \quad (2)$$

where $n_{gr}$ is a group index. In a regular waveguide with small dispersion, $n_{gr}$=n; therefore, $$\frac{d\theta}{d\lambda} = \frac{1}{T * \cos(\theta)} \quad (3)$$

It follows from Eq. (3) that at normal incidence and T=λ/n that $$d\theta = \frac{n * d\lambda}{\lambda} = 4.4° \quad (4)$$

for n=2 at wavelengths ranging from 510 nm to 530 nm. In accordance with this disclosure, the angular range may be increased to some extent by increasing the angle of diffraction θ. For example, by reducing the grating pitch to 180 nm, one may achieve the range of diffraction angles dθ to 14.4 degrees.

Figure 17:
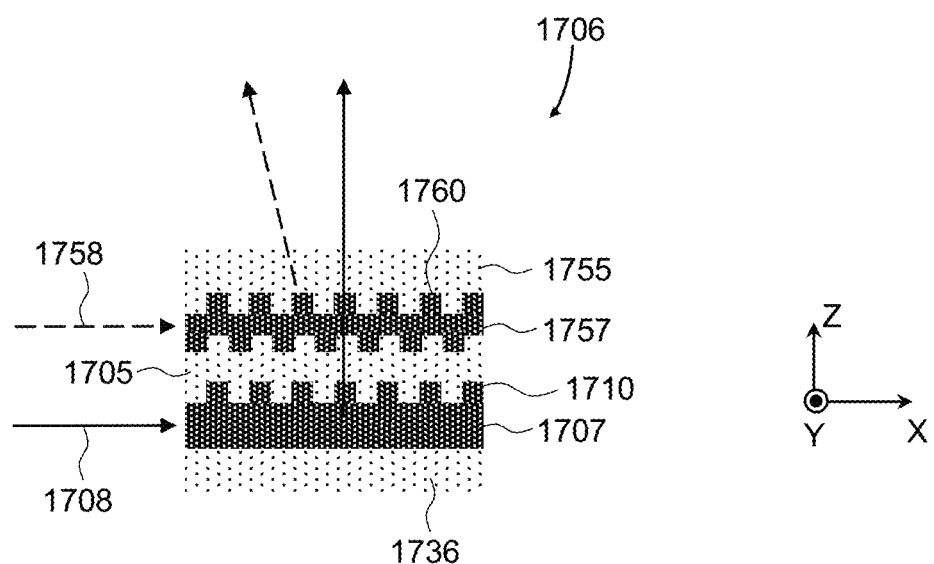
FIG. 17 is a side cross-sectional view of a dual-core waveguide for broadening an angular dispersion range of an out-coupler.

The angular dispersion range may be increased e.g. by using a multi-layer output waveguide. Referring to FIG. 17, a dual-core slab waveguide 1706 extends in XY plane. The dual-core slab waveguide 1706 includes first 1707 and second 1757 cores running parallel to one another in XY plane of a substrate 1736 surrounded by first 1705 and second 1755 claddings respectively. The first core 1707 and the first cladding 1705 are configured for singlemode propagation of a first beam (solid arrows; 1708) of image light. Similarly, the second core 1757 and the second cladding 1755 are configured for singlemode propagation of a second beam (dashed arrows; 1758) of image light.

The first 1707 and second 1757 cores have first 1710 and second 1760 diffraction gratings formed in or on the first 1707 and second 1757 cores, respectively. The first diffraction grating 1710 is configured to out-couple spectral component(s) of the redirected image light at a first angle dependent on the first wavelength. The first angle is within a first angle range corresponding to a tuning range of a wavelength-tunable light source used. Similarly, the second diffraction grating 1760 is configured to out-couple spectral component(s) of the redirected image light at a second angle different from the first angle. The second angle is within a second angle range corresponding to the tuning range of the wavelength-tunable light source.

Different angles and angular ranges of diffraction from different cores 1707, 1757 of the dual-core waveguide 1706 can be attained by changing the thickness or refractive index of the cores 1707 and 1757, refractive index of the claddings 1705 and 1755, or pitch of the diffraction gratings 1710 and 1760, for the same wavelength of the image light represented by the first 1708 and second 1758 light beams. To simplify fabrication, a single grating can be etched into the first core 1707 layer, and the second core 1757 layer or any subsequent layer(s) may reproduce this grating simply through a directional material deposition. In the latter case, the FOV may be adjusted by varying the thickness of the layers and, therefore, the effective refractive index.

Different angles of diffraction may be used to expand the corresponding "vertical" 1D FOV by tiling smaller angular ranges from separate layers. Herein, the term "vertical" is meant to differentiate from the 1D FOV by redirecting the image light in plane of the low-mode waveguide, i.e. XY plane, which is termed "horizontal". It is to be noted that the terms "horizontal" and "vertical" in this context are meant as mere differentiators to distinguish in-plane 1D FOV from wavelength dispersion 1D FOV, and do not imply the actual orientation of the devices when in use. The switching between the first 1707 and second 1757 cores can be achieved, for example, using Mach-Zehnder interferometers and directional couplers. More details on possible switching configurations will be provided further below.

Figure 18:
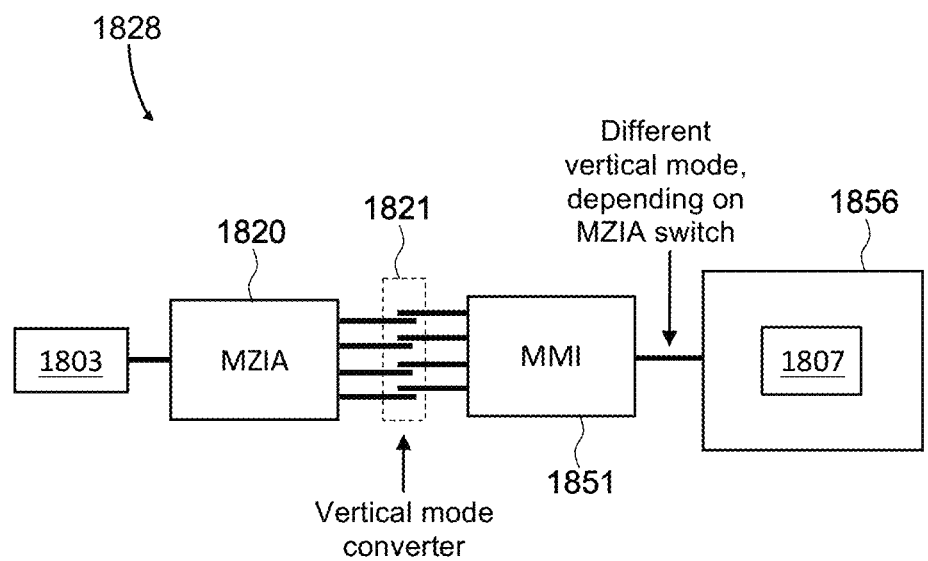
FIG. 18 is a top view of a few-modes waveguide (FMW) for broadening an angular dispersion range of an out-coupler.

Turning to FIG. 18, an angular dispersion module 1828 provides enhanced wavelength dispersion of image light to obtain the required vertical 1D FOV. The angular dispersion module 1828 includes serially coupled: a MZIA 1820 coupled to a vertical mode converter 1821, e.g. a non-symmetrical directional coupler, a multimode interference (MMI) coupler 1851 receiving light from the vertical mode converter 1821, and a few-mode slab waveguide portion 1856 receiving light from the MMI coupler 1851. The number of transversal modes of propagation of image light that may propagate in a core of the few-mode slab waveguide portion 1956 may be 2, 3, 4, 5, or 6, for example, or more generally no more than 10 modes. A diffraction grating 1807 disposed in or on the core of the few-mode slab waveguide portion 1856 operates as an out-coupler, outcoupling the image light at an angle dependent on wavelength. The diffraction grating 1807 is configured to out-couple each spectral component of the redirected image light at an angle dependent on the wavelength of the spectral component. The out-coupling angle is within an out-coupling angle range corresponding to a tuning range of the wavelength-tunable light source used. The out-coupling angle range is different for different lateral modes of propagation of the few-mode slab waveguide portion 1856, because each mode of propagation has a different effective refractive index.

Initially, only a fundamental mode of image light is coupled by an in-coupler 1803 into the MZIA 1820. The MZIA 1820 functions as 1×N optical switch, switching the image light between its output waveguides. At the end of each MZIA 1820 output waveguide, the image light is converted into a different vertical mode by the vertical mode converter 1821. The image light from all the waveguides is combined into the few-mode slab waveguide portion 1956 using the MMI coupler 1851n this manner, the in-plane image encoder layout, i.e. horizontal 1D imager circuitry disclosed above with reference to FIGS. 9-15, may be shared between different modes of propagation of image light in the FMW 1856.

Different vertical modes have different effective refractive indices and, therefore, will diffract at the diffraction grating 1807 at different angles for the same wavelength. The overall vertical 1D FOV may be expanded using diffraction ranges of the separate modes in a time-sequential manner, that is, switching to a particular core providing a corresponding vertical 1D FOV portion, then switching to another core providing a different vertical 1D FOV portion, and so on, until all the vertical 1D FOV is covered. The MMI coupler 1851 may be optimized for the required coupling of vertical modes using a physical design software by defining an optimization function (also termed merit function) to have operands representing optical insertion loss of the MMI coupler for each vertical mode having pre-defined vertical coordinates, and letting the physical design software run the optimization.

The coupling configuration of FIG. 18, i.e. the MZIA 182 coupled to the vertical mode converter 1821 coupled to the MMI 1851, may be used to couple the image light received by the in-coupler 1803 into different vertical modes of any waveguide component supporting several vertical modes. Such a configuration may be used, for example, to couple image light into cores of the dual-core slab waveguide 1706 of FIG. 17. In case of the dual-core slab waveguide 1706, only one Mach-Zehnder interferometer, operating as 1×2 optical switch, may be used instead of the MZIA 1820. A multi-core slab waveguide may include a plurality of cores, and the coupling configuration of FIG. 18 may be used to couple the image light into any of the cores of the multi-core slab waveguide.

Figure 19:
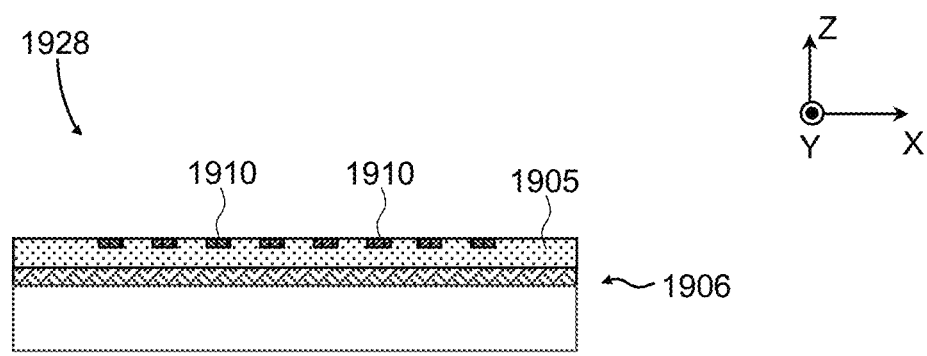
FIG. 19 a side cross-sectional view of a high-dispersion out-coupler based on a slow light waveguide.

Referring to FIG. 19, an angular dispersion enhancer 1928 is based on a slow-light slab waveguide 1906 extending in XY plane and supporting a cladding 1905 with a diffraction grating structure 1910 for out-coupling image light form the slow-light waveguide 1906. The slow-light waveguide 1906 may include a uniform 2D photonic crystal, a multilayer structure, or a combination of the two, for increasing a group velocity refractive index by a factor of 20, for example, or at least by a factor of 10. Then, it follows from Eqs. (2)-(4) than the FOV may be increased tenfold, e.g. from 4.4 degrees to 44 degrees for the slowing factor of 20. In some embodiments, the slow-light waveguide 2006 may include an array of linear photonic crystal waveguides.

Figure 20A:
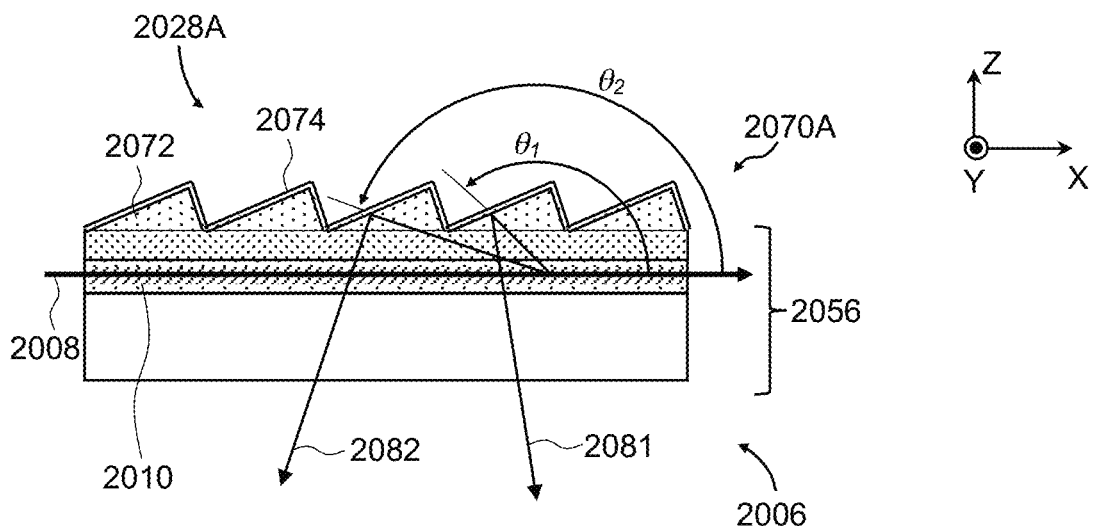
FIG. 20A is a side cross-sectional view of a high-dispersion out-coupler based on a waveguide grating and a corrugated reflector.

Referring to FIG. 20A, an angular dispersion enhancer 2028A includes a low-mode waveguide 2006 having a slab waveguide portion 2056 disposed in XY plane, and a corrugated reflector 2070A supported by the slab waveguide portion 2056. Image light 2008, carrying image information encoded in its spectrum, propagates in the slab waveguide portion 2056. A diffraction grating 2010, e.g. a Bragg grating, in the slab waveguide portion 2056 out-couples different spectral components of image light 2008 at different angles exceeding 90 degrees w.r.t. a direction of propagation of the image light 2008 in the slab waveguide portion 2056. For example, a first spectral component 2081 is out-coupled at a first angle $\theta_1$, and a second spectral component 2081 is out-coupled at a second, larger angle $\theta_2$. The corrugated reflector 2070A reflects the first 2081 and second 2082 spectral components of the image light 2008 diffracted by the diffraction grating 2010 through the slab waveguide portion 2056 and outside of the low-mode waveguide 2056.

The angular dispersion of the out-coupled image light 2008 is largest when the image light 2008 is out-coupled almost directly back, i.e. the angle θ approaches 180 degrees. For example, assuming a regular waveguide grating with refractive index of 2, changing the wavelength from 510 nm to 530 nm causes 4.4° shift if the averaged diffraction angle θ is zero, but 14° shift if the average diffraction angle θ is ~65°. In this configuration, the diffraction grating 2010 out-couples the image light 2008 backwards to maximize the angular dispersion and, therefore, increase the FOV of a display. The corrugated reflector 2070A may include a plurality of prisms 2072 with reflective coating 2074 supported by the slab waveguide portion 2056, which redirect the image light 2008 in the direction normal to the slab waveguide portion 2056 to make sure that the central field angle is perpendicular to the slab waveguide portion 2056, i.e. is parallel to Z-axis. By way of a non-limiting example, the reflective layer 2074 can be made of either one of the following or a combination of: (1) a lower refractive index material for total internal reflection (TIR), (2) a thin metal layer forming a semi-reflective mirror, or (3) a narrow-spectrum multilayer mirror coating or a reflective polarizer, such as a wire grid polarizer or a dual brightness enhancement film (DBEF).

Figure 20B:
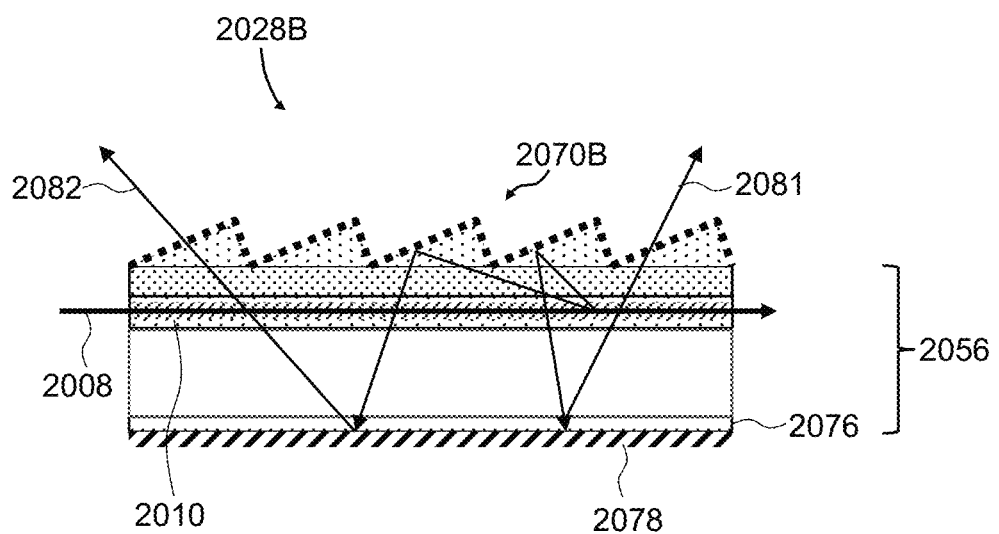
FIG. 20B is a side cross-sectional view of a high-dispersion out-coupler based on a waveguide grating and a polarization-selective corrugated reflector.

Turning to FIG. 20B, an angular dispersion enhancer 2028B is a polarization-selective embodiment of the angular dispersion enhancer 2028A of FIG. 20A. In the angular dispersion enhancer 2028B of FIG. 20B, the corrugated reflector includes a polarization-selective reflector 2070B configured to reflect light at a first polarization and transmit light at a second polarization orthogonal to the first polarization. The angular dispersion enhancer 2028B further includes a quarter-wave waveplate (QWP) 2076 supported by the slab waveguide portion 2056 on an opposite side of the slab waveguide portion 2056 from the polarization-selective reflector 2070B. The QWP 2076 is configured to receive the image light components 2081, 2082 reflected by the polarization-selective reflector 2070B. The image light components 2081, 2082 are in the first polarization state.

A diffractive structure 2078, e.g. a reflective surface-relief diffraction grating, is supported by the QWP 2076 and configured to reflect the image light components 2081, 2082 propagated through the QWP 2076 back to propagate through the QWP 2076 for a second time converting the polarization of the image light components 2081, 2082 from the first polarization to the second polarization. Then, the components 2081, 2082 propagate through the slab waveguide portion 2056, and through the polarization-selective reflector 2070B, which transmits them through because they are in the second polarization state. The purpose of the diffractive structure 2078 is to further increase the angular dispersion of the image light 2008.

Referring to FIGS. 21A and 21B, a principle of varifocal adjustment (i.e. adjusting the convergence/divergence) of the out-coupled image light is illustrated. A low-mode slab waveguide portion 2156A in FIG. 21A includes a grating out-coupler with a uniform refractive index. An image light component 2108 is out-coupled vertically, i.e. perpendicular to the plane of the slab waveguide portion 2156A, as a parallel beam focused at infinity. A slab waveguide portion 2156B in FIG. 21B includes a grating out-coupler with a controllable non-uniform refractive index to cause the image light component 2108 to be out-coupled vertically, i.e. perpendicular to the plane of the slab waveguide portion 2156B, with a convergence as shown, as a focused beam at a focal distance equal to an inverse of the optical power (focusing power) of the grating out-coupler. Assuming a desired size of an eyebox 2112 of 16 mm, a 0.008 refractive delta is required to focus the image light component 2108 from the slab waveguide portion 2156B into a focal spot 2185 two meters away for the eyebox 2112. To achieve this focusing function, the effective refractive index $n_{eff}$ of the grating out-coupler needs to vary linearly from a 0.004 to −0.004 in going across the eyebox 2112. This principle may be used in any dispersion enhancer considered herein. For a dispersion enhancer with a resonating structure, any change in the physical refractive index of the materials in the stack would generate a larger change in $n_{eff}$, thus facilitating the focusing or defocusing due to the change of refractive index along an out-coupler. Illustrative example of varifocal adjusters based on this principle are considered below with reference to FIGS. 22 to 25.

Referring first to FIG. 22, a varifocal adjuster 2230 includes a low-mode slab waveguide portion 2256 for propagating light, e.g. image light 2208. The slab waveguide portion 2256 includes an out-coupler 2210, e.g. a Brag grating, configured to out-couple the image light 2208 at an angle to the XY plane of the slab waveguide portion 2256. A liquid crystal (LC) cell 2288 is evanescently coupled to the slab waveguide portion 2256. The thickness of an upper cladding 2287 of the slab waveguide portion 2256 is selected such that a tail of a guided mode 2290 of the image light 2208 travelling in the core of the mode slab waveguide portion 2256 overlaps the LC cell 2288, reaching an LC layer 2289 of the LC cell 2288 through an upper cladding 2287 supporting the LC cell 2288. The LC layer 2289 is disposed between a pair of electrodes 2283. The guided mode 2290 overlaps the LC layer 2289 of the LC cell 2288.

The LC cell 2288 defines an effective refractive index for the guided mode 2290 of the image light 2208 propagating in the slab waveguide portion 2256. The effective refractive index $n_{eff}$ varies in a direction of propagation of the image light 2208 in the low-mode slab waveguide 2256, that is, X-direction in FIG. 22. The varying effective refractive index $n_{eff}$ causes a direction of the out-coupled image light 2208 portions to vary in going along X-axis, which causes the out-coupled image light 2208 to focus or defocus, as explained above with reference to FIGS. 21A and 21B. The thickness profile of the upper cladding 2287 (FIG. 22) may be selected so that a change of the refractive index of the LC layer 2289 would cause a linear change of the effective refractive index $n_{eff}$ for the propagating waveguide mode 2290. This will cause the out-coupled image light 2208 to be focused or defocused. The absolute value of the change and, therefore, the focal length, can be controlled by a voltage applied to the LC cell 2288. The thickness profile of the upper cladding 2287 may be made linear, i.e. the LC cell 2288 may form an acute angle with the slab waveguide portion 2256, thereby varying the effective refractive index $n_{eff}$ for the waveguide mode 2290.

The refractive index of the LC layer 2289 is varied by applying voltage to the LC cell 2288. As explained above, this causes a direction of propagation of the out-coupled image light 2208 to vary along the direction of propagation (i.e. X-direction) of the image light 2208 in the slab waveguide portion 2256, causing the out-coupled image light 2208 to diverge or converge in XZ plane. By varying the applied voltage, the divergence/convergence of the out-coupled image light 2208 (collectively termed "divergence") may controlled. In some embodiments, the LC cell 2288 may be parallel to the slab waveguide portion 2256, and may be pixelated to impart a refractive index change profile along the direction of propagation of the image light 2208, that is, along the X-direction.

Figure 23:
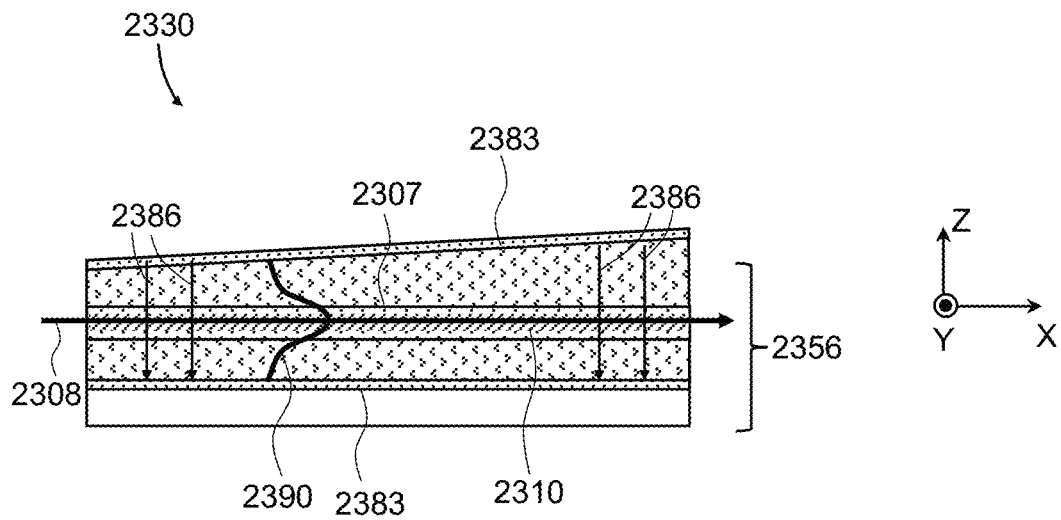
FIG. 23 is a side cross-sectional views of a varifocal out-coupler embodiment based on a wedged Pockels cell.

Referring now to FIG. 23, a varifocal adjuster 2330 includes a low-mode slab waveguide portion 2356 for propagating light, e.g. image light 2308. The slab waveguide portion 2356 includes a core layer 2307 and an out-coupler 2310 configured to out-couple the image light 2308 at an angle to a plane of the slab waveguide portion. The core layer 2307 is made of a material having a refractive index dependent on an applied electric field. For example, the core layer 2307 may be made of LiNbO3, AlN, SiC, or another material with a high electro-optic coefficient.

Electrodes 2383 are disposed above and below the core layer 2307 for applying an electric field 2386 to the core layer 2307. The electrodes 2383 may be disposed at an acute angle to each other, forming a wedge. When a voltage is applied to the electrodes 2383, the electric field 2386 spatially varies along the direction of propagation of the image light 2308 in the core 2307 of the slab waveguide portion 2356, i.e. along X-direction. This causes a direction of the image light 2308 out-coupled from the slab waveguide portion 2356 to vary along the a direction of propagation of the light in the low-mode slab waveguide, effectively causing the out-coupled image light 2208 to diverge or converge in XZ plane. By varying the applied voltage, the degree of convergence/divergence of the out-coupled image light 2308 may be varied in a controllable manner.

The spatial modulation of refractive index may be achieved by a DC or AC electric field that passes through the materials of the slab waveguide portion 2356 and a propagating optical mode 2390. Depending on the crystal axis in which the refractive modulation is desired and the component design, electrodes can be placed either above/below the upper/lower cladding respectively, or just in one of these layers. In case where the electrodes sandwich the core of the waveguide, the electric field 2386 will run vertically as shown in FIG. 23. The relative magnitude of the electric field 2386 along the propagation of the image light 2308 (which is the one that needed to be controlled to achieve focusing) can be assigned by changing the distance between electrodes 2382. Larger distance will yield a weaker electric field 2386. By doing so, one can embed a pre-determine wedge profile electric field 2386 that proportionally correlates with local refractive index change. When the applied voltage V=0, the image light 2308 is collimated, i.e. the image is at infinity. As the applied voltage V is increased, the focal plane of the system will get closer.

Figure 24:
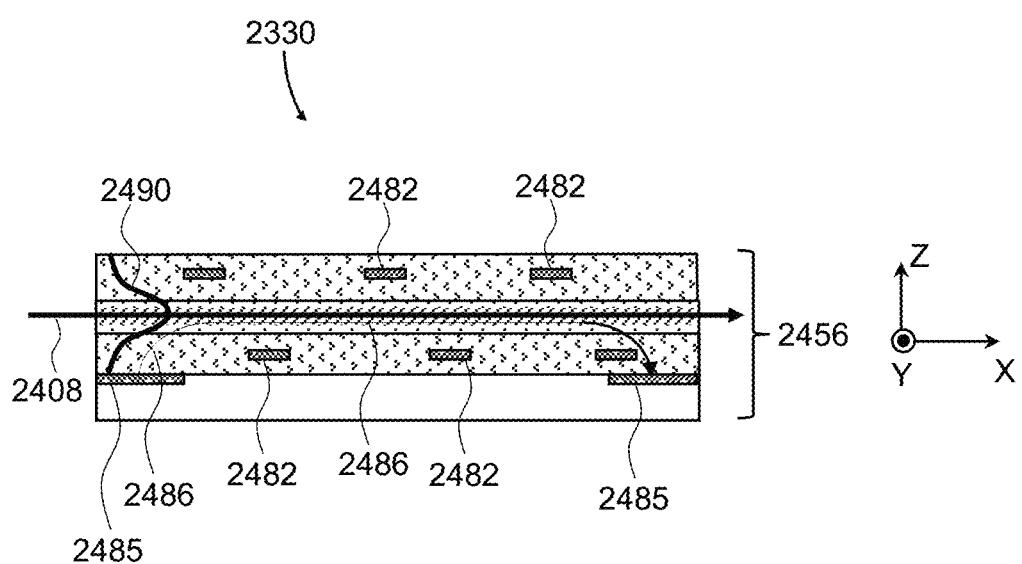
FIG. 24 is a side cross-sectional views of a varifocal out-coupler embodiment based on a Pockels cell with buried electrodes.

A similar principle is applied in a varifocal adjuster 2430 of FIG. 24, where an electric field 2486 is parallel to a core layer 2407 of a few-mode slab waveguide 2456. Such orientation of the electric field 2486 is defined by floating electrodes 2482 extending along a direction of propagation of the image light 2408 in the low-mode slab waveguide 2456 between a pair of end electrodes 2485, to which the voltage V may be applied. The floating electrodes 2482 are disposed so as to provide a magnitude distribution of the electric field 2486 that matches a refractive index distribution required for focusing of the out-coupled image light 2408. In some embodiments, a set of independently controlled electrodes might be provided to have a better control of the magnitude distribution of the electric field 2486.

Figure 25:
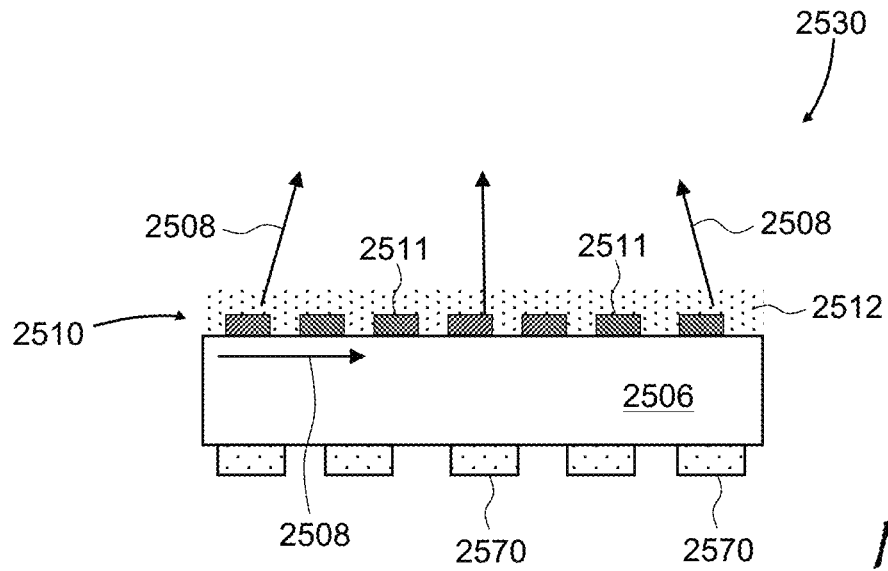
FIG. 25 is a side cross-sectional view of a varifocal out-coupler embodiment based on a thermo-optic effect.

Referring now to FIG. 25, a varifocal adjuster 2530 includes a low-mode slab waveguide portion 2506 supporting a grating structure 2510 including an array of grating fringes 2511 having a first refractive index and surrounded by a substrate 2512 between individual grating fringes 2510 having a second refractive index. The grating structure 2510 out-couples image light 2508 form the low-mode slab waveguide portion 2506. At least one of the first or second refractive index is tunable to provide a gradient of the at least one of the first or second refractive index for focusing or defocusing of the image light 2508 out-coupled from the slab waveguide portion by the out-coupler. To that end, an array of heating elements 2570 may be coupled to the waveguide 2506 for providing a non-uniform, spatially selective heating to the grating structure 2510. The spatially selective heating creates a refractive index gradient, which may modify local diffraction angle for the image light 2508, thereby enabling focusing or defocusing of the image light 2508 out-coupled from the waveguide 2506. By way of a non-limiting example, to achieve a 1 m focal distance for 16 mm eyebox length one needs a maximum Δn=0.008 for the effective refractive index. This number will become proportionally smaller if a slow light waveguide is used instead of the waveguide 2506. In some embodiments, the substrate 2510 may include a liquid crystal (LC) layer to provide a required refractive index gradient by tuning the LC layer with an applied electric field. Since the layer in which the refractive index is modified is thin, it will only affect the display optical path but not the see-through optical path.

Figure 26:
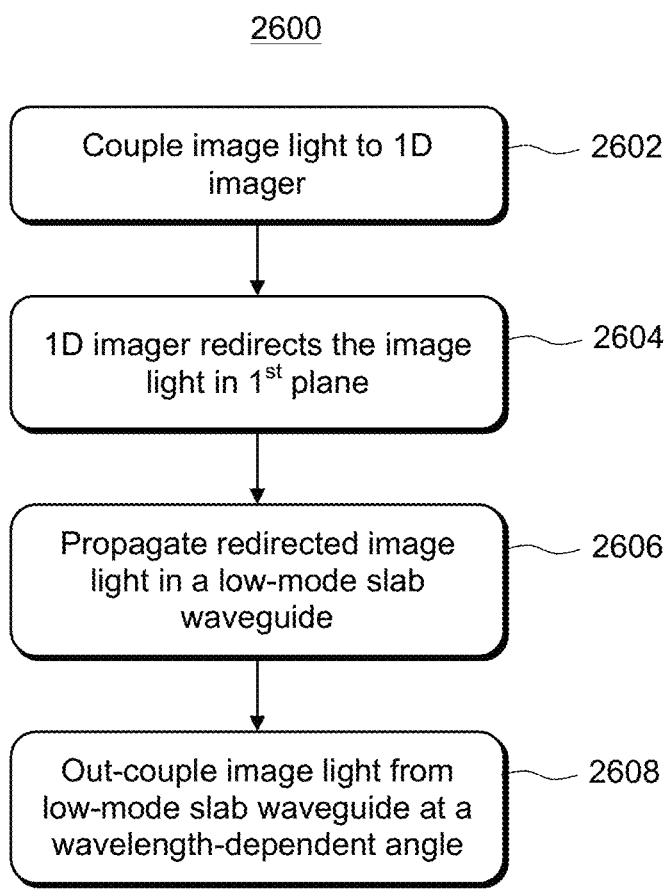
FIG. 26 is a flow chart of method for providing an image in angular domain.

Referring to FIG. 26 with further reference to FIG. 1A, a method 2600 (FIG. 26) for providing an image in angular domain includes coupling (2602) image light, e.g. the light 108 in FIG. 1A, including a spectral component at a first wavelength, to a 1D redirector/imager using an in-coupler, e.g. the in-coupler 103. The image light may be redirected using any of the horizontal FOV 1D redirectors/imagers disclosed herein, e.g. the phased array 1D imager 904 of FIG. 9 including any of the PIC embodiments of FIGS. 10A to 10E, the hybrid 1D imager 1104 of FIG. 11, or the FSO 1D scanner 1204 of FIG. 12. The 1D imager redirects (2604) the image light in a first plane, e.g. in the XY plane (which is the plane of the low-mode slab waveguide portion 107) in FIG. 1A. The image light 108 redirected by the 1D imager is propagated (2606) tin a in a low-mode slab waveguide portion 107. The spectral component at the first wavelength is out-coupled (2608) from the low-mode slab waveguide by the out-coupler 110, e.g. any of the grating out-couplers considered herein, at an angle dependent on the first wavelength. The low-mode slab waveguide portion may include a singlemode slab waveguide or a few-mode (no greater than 10 modes) slab waveguide.

Figure 27:
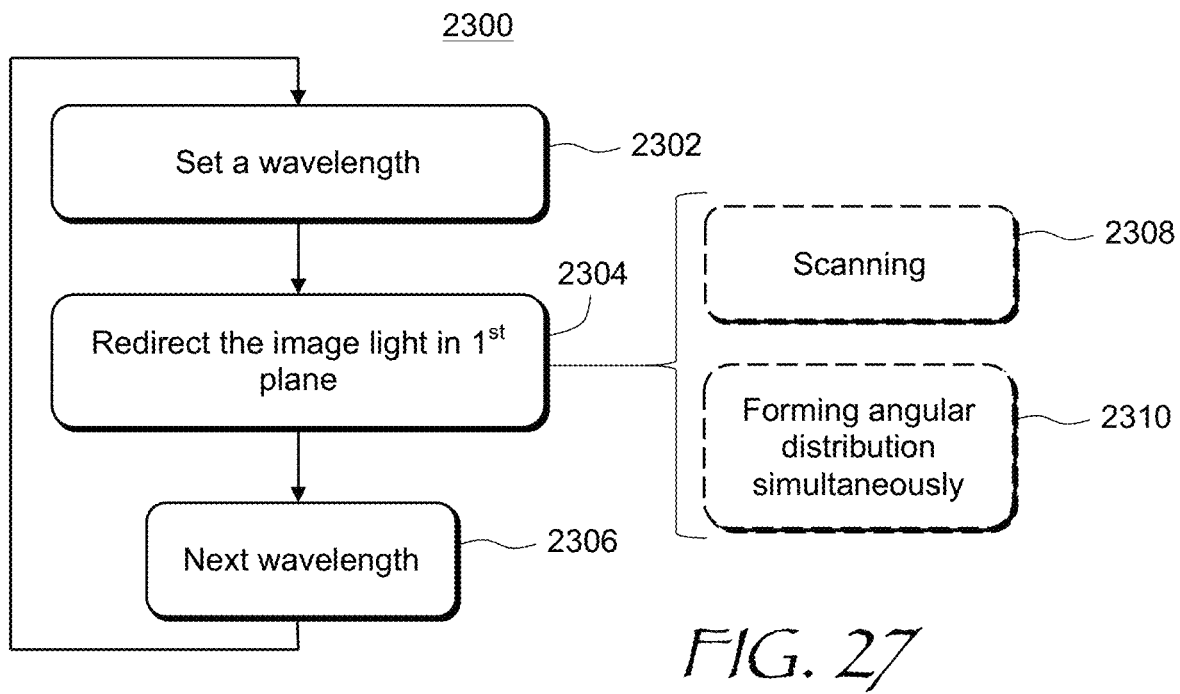
FIG. 27 is a flow chart of a variant of the method of FIG. 26 utilizing 1D scanning/rendering at a set wavelength.

Turning to FIG. 27, a method 2700 is an embodiment of the method 2600 of FIG. 26. The method 2700 of FIG. 27 uses a monochromatic tunable source of image light, such as the tunable laser source 502 of FIG. 5, for example. The method 2700 includes setting (2702) an emission wavelength of the monochromatic tunable source and redirecting (2704) the image light coupled into the 1D imager in the XY plane. In other words, the wavelength of the tunable light source is not shifted while the 1D imager redirects the image light in the first plane, whereby the image light redirected in the first plane is out-coupled at the same angle. Then, next wavelength (2706) is set and the process repeats, at its own value of output power of the light source corresponding to a desired brightness of a pixel of an image being displayed. The redirection in XY plane includes angularly scanning (2708) a collimated light beam in XY plane, or forming the angular distribution of brightness simultaneously (2710).

Figure 28:
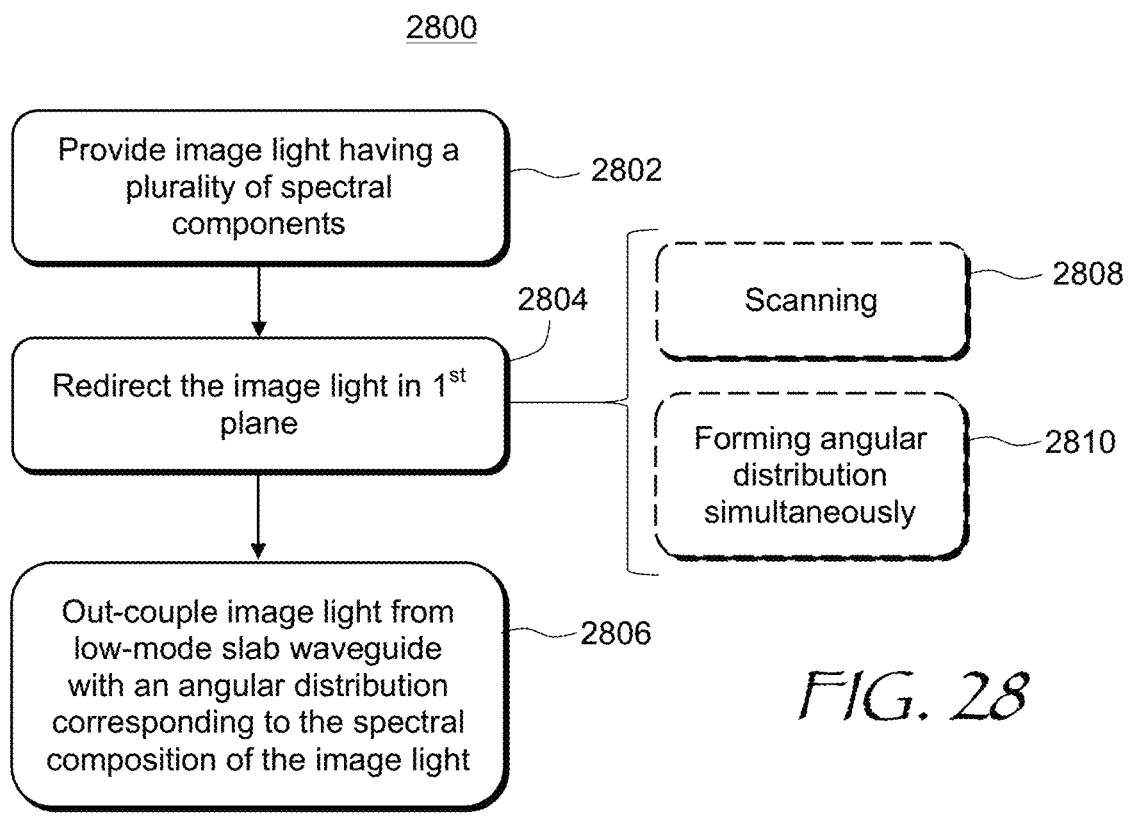
FIG. 28 is a flow chart of a variant of the method of FIG. 26 using simultaneous generation of frames of an image to be displayed.

Referring now to FIG. 28, a method 2800 is an embodiment of the method 2600 of FIG. 26. The method 2800 of FIG. 28 uses a tunable-spectrum light source, e.g. the tunable-spectrum light source 602 of FIG. 6A. The method 2800 of FIG. 28 includes using the tunable-spectrum light source to provide (2802) image light having a plurality of spectral components corresponding to the vertical FOV of the image to be displayed. The image light with the plurality of spectral components is redirected (2804) in XY plane by providing angular distribution of brightness in XY plane, which may be done by scanning (2808) or forming the instantaneous angular distribution (2810). The angularly dispersed, multi-wavelength image light is out-coupled (2806) from the low-mode slab waveguide with an angular distribution corresponding to the spectral composition of the image light.

Figure 29:
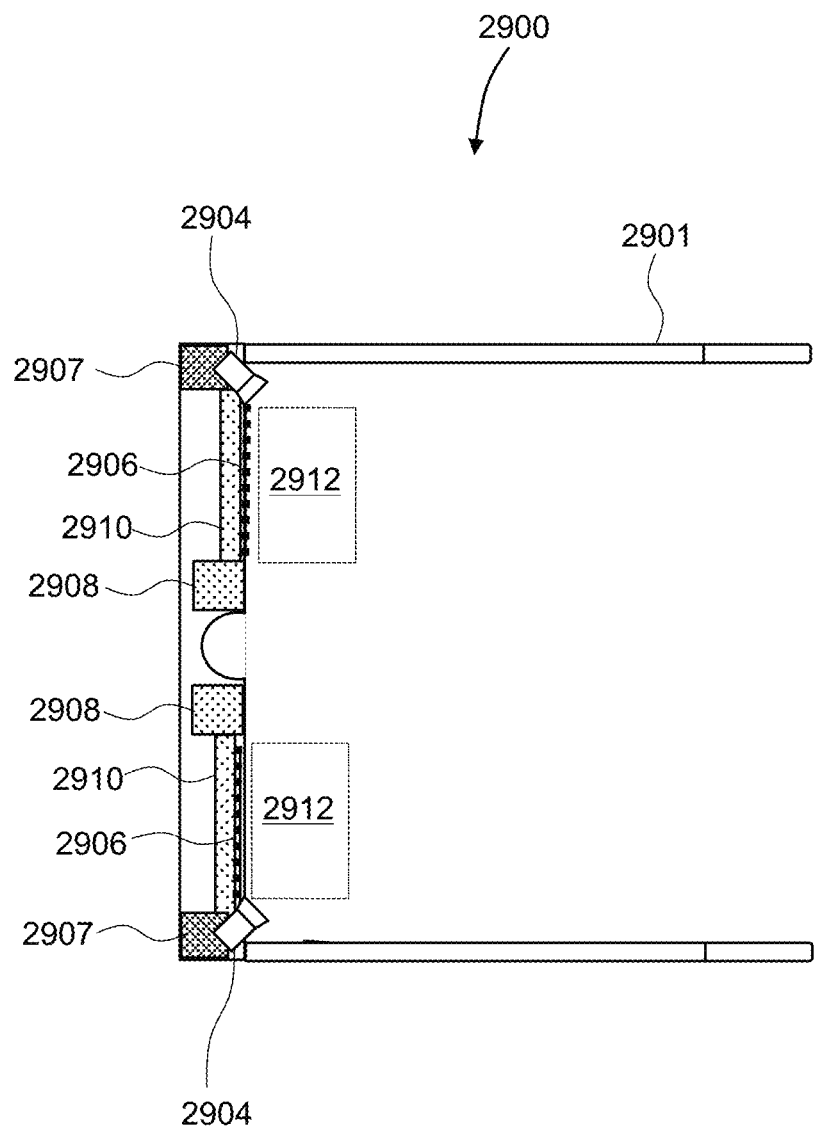
FIG. 29 is a view of an augmented reality (AR) display of this disclosure having a form factor of a pair of eyeglasses.

Turning to FIG. 29, an augmented reality (AR) near-eye display 2900 includes a frame 2901 having a form factor of a pair of eyeglasses. The frame 2901 supports, for each eye, a light engine 2908 including a tunable-spectrum light source described herein, and a low-mode, i.e. a singlemode or few-mode waveguide 2910 disclosed herein, optically coupled to the light engine 2908. The AR near-eye display 2900 may further include an eye-tracking camera 2904, a plurality of illuminators 2906, and an eye-tracking camera controller 2907. The illuminators 2906 may be supported by the waveguide 2910 for illuminating an eyebox 2912. The light engine 2908 provides a light beam having a spectrum representative of the vertical 1D FOV to be projected into a user's eye. The waveguide 2910 receives the light beam and expands the light beam over the eyebox 2912. The horizontal 1D FOV may be provided by a 1D imager disclosed herein, e.g. the PIC-based imager 436 of FIG. 4A, the phased array 1D imager 904 of FIG. 9, the hybrid 1D imager 1104 of FIG. 1, or MEMS-based scanner of 1204 FIG. 12.

The purpose of the eye-tracking cameras 2904 is to determine position and/or orientation of both eyes of the user. Once the position and orientation of the user's eyes are known, a gaze convergence distance and direction may be determined. The imagery displayed may be adjusted dynamically to account for the user's gaze, for a better fidelity of immersion of the user into the displayed augmented reality scenery, and/or to provide specific functions of interaction with the augmented reality. In operation, the illuminators 2906 illuminate the eyes at the corresponding eyeboxes 2912, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 2912.

The function of the eye-tracking camera controllers 2907 is to process images obtained by the eye-tracking cameras 2904 to determine, in real time, the eye gazing directions of both eyes of the user. In some embodiments, the image processing and eye position/orientation determination functions may be performed by a central controller, not shown, of the AR near-eye display 2900. The central controller may also provide control signals to the light engines 2908 depending on the determined eye positions, eye orientations, gaze directions, eyes vergence, etc.

Figure 30:
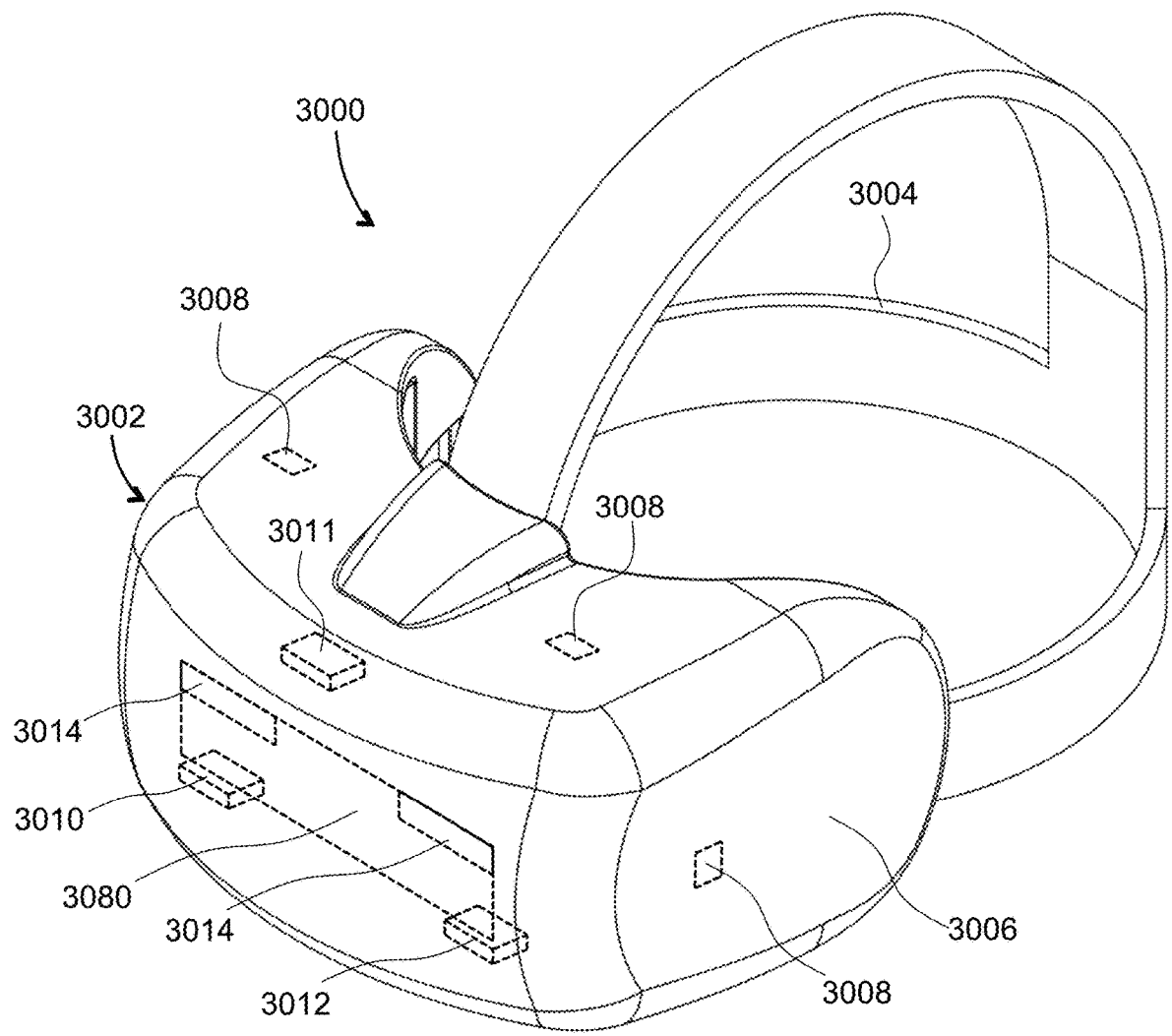
FIG. 30 is an isometric view of a virtual reality (VR) display of this disclosure, according to an embodiment.

Referring now to FIG. 30, an HMD 3000 is an example of an AR/VR wearable display system which encloses the user's face, for a greater degree of immersion into the AR/VR environment. The function of the HMD 3000 is to augment views of a physical, real-world environment with computer-generated imagery, or to generate the entirely virtual 3D imagery. The HMD 3000 may include a front body 3002 and a band 3004. The front body 3002 is configured for placement in front of eyes of a user in a reliable and comfortable manner, and the band 3004 may be stretched to secure the front body 3002 on the user's head. A display system 3080 may be disposed in the front body 3002 for presenting AR/VR imagery to the user. Sides 3006 of the front body 3002 may be opaque or transparent.

In some embodiments, the front body 3002 includes locators 3008 and an inertial measurement unit (IMU) 3010 for tracking acceleration of the HMD 3000, and position sensors 3012 for tracking position of the HMD 3000. The IMU 3010 is an electronic device that generates data indicating a position of the HMD 3000 based on measurement signals received from one or more of position sensors 3012, which generate one or more measurement signals in response to motion of the HMD 3000. Examples of position sensors 3012 include: one or more accelerometers, one or more gyroscopes, one or more magnetometers, another suitable type of sensor that detects motion, a type of sensor used for error correction of the IMU 3010, or some combination thereof. The position sensors 3012 may be located external to the IMU 3010, internal to the IMU 3010, or some combination thereof.

The locators 3008 are traced by an external imaging device of a virtual reality system, such that the virtual reality system can track the location and orientation of the entire HMD 3000. Information generated by the IMU 3010 and the position sensors 3012 may be compared with the position and orientation obtained by tracking the locators 3008, for improved tracking accuracy of position and orientation of the HMD 3000. Accurate position and orientation is important for presenting appropriate virtual scenery to the user as the latter moves and turns in 3D space.

The HMD 3000 may further include a depth camera assembly (DCA) 3011, which captures data describing depth information of a local area surrounding some or all of the HMD 3000. To that end, the DCA 3011 may include a laser radar (LIDAR), or a similar device. The depth information may be compared with the information from the IMU 3010, for better accuracy of determination of position and orientation of the HMD 3000 in 3D space.

The HMD 3000 may further include an eye tracking system 3014 for determining orientation and position of user's eyes in real time. The obtained position and orientation of the eyes also allows the HMD 3000 to determine the gaze direction of the user and to adjust the image generated by the display system 3080 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 3002.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A device for redirecting light in two dimensions, the device comprising:
   a wavelength-tunable light source for providing light comprising a spectral component at a first wavelength;
   a microelectromechanical system (MEMS) beam scanner coupled to the wavelength-tunable light source for redirecting the light in a first plane;
   a low-mode waveguide in the first plane, the low-mode waveguide comprising a slab waveguide portion coupled to the MEMS beam scanner for propagating the light redirected by the MEMS beam scanner, the slab waveguide portion comprising an out-coupler configured to out-couple the spectral component of the redirected light in a second plane at an angle dependent on the first wavelength, wherein the second plane is non-parallel to the first plane; and
   an in-coupler for coupling the light redirected by the MEMS beam scanner into the slab waveguide portion of the low-mode waveguide.

2. The device of claim 1, wherein the slab waveguide portion comprises a singlemode slab waveguide.

3. The device of claim 1, wherein the slab waveguide portion comprises a few-mode slab waveguide supporting no more than 10 lateral modes of propagation.

4. The device of claim 1, wherein the wavelength-tunable light source comprises a wavelength-tunable laser comprising an intracavity wavelength-selective element for selecting the spectral component at the first wavelength.

5. A device for redirecting light in two dimensions, the device comprising:
   a wavelength-tunable light source for providing light comprising a spectral component at a first wavelength;
   a 1D redirector coupled to the wavelength-tunable light source for redirecting the light in a first plane;
   a low-mode waveguide in the first plane, the low-mode waveguide comprising:
      a slab waveguide portion coupled to the 1D redirector for propagating the light redirected by the 1D redirector, the slab waveguide portion comprising an out-coupler configured to out-couple the spectral component of the redirected light in a second plane at an angle dependent on the first wavelength, wherein the second plane is non-parallel to the first plane; and The device of claim 1, wherein the low mode waveguide comprises a 1D field of view (FOV) expander in an optical path of the light, wherein the 1D FOV expander is configured to switch the light between a plurality of conterminous FOV portions; and an in-coupler for coupling the light into the low-mode waveguide.

6. The device of claim 5, wherein the 1D FOV expander comprises a tunable beam steering device comprising a liquid crystal (LC) cladding section of the slab waveguide portion of low-mode waveguide.

7. A device for redirecting light in two dimensions, the device comprising:
  a wavelength-tunable light source for providing light comprising a spectral component at a first wavelength;
  a 1D redirector coupled to the wavelength-tunable light source for redirecting the light in a first plane;
  a low-mode waveguide in the first plane, the low-mode waveguide comprising:
    a slab waveguide portion coupled to the 1D redirector for propagating the light redirected by the 1D redirector, the slab waveguide portion comprising an out-coupler configured to out-couple the spectral component of the redirected light in a second plane at an angle dependent on the first wavelength, wherein the second plane is non-parallel to the first plane; and
  a 1D lateral beam expander in an optical path of the light, wherein the 1D lateral beam expander is configured to increase a width of a collimated portion of the light in the first plane; and an in-coupler for coupling the light into the low-mode waveguide.

8. The device of claim 7, wherein the 1D lateral beam expander comprises a hologram configured to reflect the collimated portion of the light at a plurality of locations along the optical path in the hologram, such that the reflected collimated portion is wider in the first plane than the collimated portion upstream of the hologram.

9. A device for providing an image in angular domain, the device comprising:
  a wavelength-tunable light source for providing image light comprising a plurality of spectral channels;
  a microelectromechanical system (MEMS) beam scanner coupled to the wavelength-tunable light source for redirecting the light in a first plane;
  a low-mode waveguide in the first plane, the low-mode waveguide comprising
  a slab waveguide portion coupled to the MEMS beam scanner for propagating the image light redirected by the MEMS beam scanner, the slab waveguide portion comprising an out-coupler configured to out-couple the spectral channels of the redirected image light in a second plane at angles dependent on wavelengths of the spectral channels, wherein the second plane is non-parallel to the first plane; and
  an in-coupler for coupling the light redirected by the MEMS beam scanner into the slab waveguide portion of the low-mode waveguide.

10. The device of claim 9, wherein the low-mode waveguide is a singlemode waveguide.

11. A method for providing an image in angular domain, the method comprising:
  coupling image light comprising a spectral component at a first wavelength to a 1D imager;
  using the 1D imager to redirect the image light in a first plane, by angularly scanning a collimated light beam in the first plane;
  propagating the image light redirected by the 1D imager in a in a low-mode slab waveguide disposed in the first plane; and
  out-coupling the spectral component of the image light from the low-mode slab waveguide at an angle dependent on the first wavelength.

12. The method of claim 11, wherein the image light is substantially monochromatic at the first wavelength, and wherein the first wavelength is not shifted while the 1D imager redirects the image light in the first plane, whereby the image light redirected in the first plane is out-coupled at the same angle.

13. A method for providing an image in angular domain, the method comprising:
  coupling image light to a 1D imager;
  using the 1D imager to redirect the image light in a first plane;
  propagating the image light redirected by the 1D imager in a in a low-mode slab waveguide disposed in the first plane; and
  out-coupling the spectral component of the image light from the low-mode slab waveguide at an angle dependent on the first wavelength;
  wherein the image light comprises a plurality of spectral components at a plurality of wavelengths including the first wavelength, and wherein redirecting the image light in the first plane comprises providing an angular distribution of brightness in the first plane, whereby the image light is redirected in the first plane simultaneously at a plurality of directions, and is out-coupled from the low-mode slab waveguide at a plurality of angles corresponding to the plurality of wavelengths of the plurality of spectral components of the image light.

* * * * *